US010389497B2

(12) United States Patent
Takeda et al.

(10) Patent No.: US 10,389,497 B2
(45) Date of Patent: *Aug. 20, 2019

(54) USER TERMINAL AND RADIO BASE STATION

(71) Applicant: NTT DOCOMO, INC., Tokyo (JP)

(72) Inventors: Kazuki Takeda, Tokyo (JP); Kazuaki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,237

(22) Filed: Apr. 25, 2018

(65) Prior Publication Data
US 2018/0248664 A1 Aug. 30, 2018

Related U.S. Application Data

(63) Continuation of application No. 15/107,473, filed as application No. PCT/JP2014/083071 on Dec. 15, 2014, now Pat. No. 9,985,758.

(30) Foreign Application Priority Data

Dec. 26, 2013 (JP) ................................. 2013-268333

(51) Int. Cl.
*H04L 5/00* (2006.01)
*H04W 72/04* (2009.01)
(Continued)

(52) U.S. Cl.
CPC .......... *H04L 5/0032* (2013.01); *H04L 5/0055* (2013.01); *H04W 48/20* (2013.01);
(Continued)

(58) Field of Classification Search
None
See application file for complete search history.

(56) References Cited

U.S. PATENT DOCUMENTS 9,209,882 B2 12/2015 Zhang et al.
9,369,998 B2 * 6/2016 Park .................... H04W 72/042
(Continued)

FOREIGN PATENT DOCUMENTS

WO 2013027963 A2 2/2013
WO 2013027963 A3 5/2013

OTHER PUBLICATIONS

Office Action issued in the counterpart European Patent Application No. 14875045.8, dated Feb. 8, 2018 (6 pages).
(Continued)

*Primary Examiner* — Michael J Moore, Jr.
(74) *Attorney, Agent, or Firm* — Osha Liang LLP

(57) ABSTRACT

A user terminal according to an embodiment of the present invention communicates with a plurality of cell groups (CG), each group being formed with one or more cells, and has a receiving section that receives downlink control information, and a processor that selects at least one cell, from cells to which uplink control signals can be allocated, and which are configured in each CG, and controls the cell as a cell to transmit an uplink control information, and when the downlink control information includes information indicative of cross-carrier scheduling, the processor determines a resource to transmit the uplink control information based on a higher layer parameter and a Control Channel Element (CCE) index of a downlink control channel to which the downlink control information is allocated.

2 Claims, 18 Drawing Sheets

(51) Int. Cl.
*H04W 48/20* (2009.01)
*H04W 72/12* (2009.01)
*H04W 48/18* (2009.01)

(52) U.S. Cl.
CPC ..... *H04W 72/042* (2013.01); *H04W 72/0413* (2013.01); *H04W 72/1268* (2013.01); *H04L 5/0023* (2013.01); *H04W 48/18* (2013.01); *H04W 72/1289* (2013.01)

(56) References Cited

U.S. PATENT DOCUMENTS

| | | | |
|---|---|---|---|
| 9,985,758 B2* | 5/2018 | Takeda | H04W 48/20 |
| 2011/0243066 A1 | 10/2011 | Nayeb Nazar et al. | |
| 2012/0113831 A1 | 5/2012 | Pelletier et al. | |
| 2012/0195292 A1 | 8/2012 | Ko et al. | |
| 2013/0034073 A1 | 2/2013 | Alba et al. | |
| 2013/0242815 A1 | 9/2013 | Wang et al. | |
| 2013/0242890 A1* | 9/2013 | He | H04W 72/0413 370/329 |
| 2014/0112280 A1 | 4/2014 | Lee et al. | |
| 2014/0219202 A1 | 8/2014 | Kim et al. | |
| 2015/0043400 A1 | 2/2015 | Choi et al. | |
| 2017/0041865 A1 | 2/2017 | Takeda et al. | |
| 2017/0245262 A1 | 8/2017 | Nayeb Nazar et al. | |

OTHER PUBLICATIONS

International Search Report issued in PCT/JP2014/083071 dated Feb. 17, 2015 (2 pages).
Written Opinion of the International Searching Authority issued in PCT/JP2014/083071 dated Feb. 17, 2015 (3 pages).
3GPP TS 36300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report dated May 17, 2017, in corresponding European Patent Application No. 14875045.8 (9 pages).
Qualcomm Incorporated; "Procedures for dual connectivity"; 3GPP TSG-RAN2#84 R2-134002; San Francisco, USA, Nov. 11-15, 2013 (5 pages).
Office Action issued in the corresponding Korean Patent Application No. 10-2016-7015949, dated Jul. 31, 2018 (10 pages).

* cited by examiner

USER TERMINAL AND RADIO BASE STATION

CROSS-REFERENCE TO RELATED APPLICATIONS

The present application is a continuation application and, thereby, claims benefit under 35 U.S.C. § 120 to U.S. patent application Ser. No. 15/107,473 filed on Jun. 23, 2016, titled, "USER TERMINAL, RADIO BASE STATION, RADIO COMMUNICATION METHOD AND RADIO COMMUNICATION SYSTEM," which is a national stage application of PCT Application No. PCT/JP2014/083071, filed on Dec. 15, 2014, which claims priority to Japanese Patent Application No. 2013-268333 filed on Dec. 26, 2013. The contents of the priority applications are incorporated by reference in their entirety.

TECHNICAL FIELD

The present invention relates to a user terminal, a radio base station, a radio communication method and a radio communication system that are applicable to a next-generation communication system.

BACKGROUND ART

In the UMTS (Universal Mobile Telecommunications System) network, the specifications of long term evolution (LTE) have been drafted for the purpose of further increasing high speed data rates, providing lower delay and so on (see non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (referred to as, for example, "LTE-advanced" or "LTE enhancement" (hereinafter referred to as "LTE-A")) are under study for the purpose of achieving further broadbandization and increased speed beyond LTE, and the specifications thereof have been drafted as Rel. 10/11.

Also, the system band of the LTE-A system (Rel. 10/11) includes at least one component carrier (CC), where the system band of the LTE system constitutes one unit. Gathering a plurality of CCs to achieve a wide band in this way is referred to as "carrier aggregation" (CA). Note that CCs will be hereinafter simply referred to as "cells."

Also, in LTE Rel. 10/11, cross-carrier scheduling (CCS) is introduced in order to realize stable transmission/reception of control signals. CCS makes it possible to report downlink control information (DCI) pertaining to a cell that transmits/receives signals using a shared data channel (PDSCH (Physical Downlink Shared Channel)/PUSCH (Physical Uplink Shared Channel)), via a control channel (PDCCH: Physical Downlink Control Channel) that is allocated to another cell.

In another successor system of LTE (LTE Rel. 12), various scenarios, in which a plurality of cells use frequency bands (carriers), are under study. When the radio base stations to form a plurality of cells are substantially the same, above-described CA (also referred to as "intra-eNB CA") can be applied. On the other hand, when the radio base stations to form a plurality of cells are completely different, dual connectivity (DC) (also referred to as "inter-eNB CA") may be applied. When DC is used, a user terminal needs to be structured to be able to allocate uplink control information (UCI) to an uplink control channel (PUCCH: Physical Uplink Control Channel) and send feedback to the radio base stations, not only in the primary cell (PCell), but also in at least one secondary cell (SCell). Hereinafter, the sending of UCI feedback via the PUCCH in at least one SCell will be also referred to as "PUCCH on SCell."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Either in CA or in DC, a system to employ CCS and PUCCH on SCell at the same time may be possible. However, the operation for when CCS and PUCCH on SCell are employed at the same time have never been studied, and therefore there is a threat a decrease in overall system performance may be caused if the PUCCH resources for feeding back UCI in response to CCS cannot be determined.

The present invention has been made in view of the above, and it is therefore one object of the present invention to provide a user terminal, a radio base station, a radio communication method and a radio communication system which can reduce the decrease of overall system performance even when CCS and PUCCH on SCell are employed at the same time in a system in which a plurality of radio base stations and user terminals communicate using CA or DC.

Solution to Problem

The user terminal according to an embodiment of the present invention provides a user terminal that communicates with a plurality of cell groups, each group being formed with one or more cells that use different frequency bands, and this user terminal has a receiving section that receives downlink signals transmitted from each cell, and a control section that selects at least one cell, from cells, to which uplink control signals can be allocated, and which are configured in each cell group, and controls the cell as a cell to transmit an uplink control signal, and, when information to indicate cross-carrier scheduling is included in a downlink control signal that is received in the receiving section, the control section decides whether or not a cell having received the downlink control signal and a cell to transmit the uplink control signal are the same, and determines a resource to allocate to the uplink control signal based on the decision.

Advantageous Effects of Invention

According to the present invention, it is possible to reduce the decrease of overall system performance even when CCS and PUCCH on SCell are employed at the same time.

DESCRIPTION OF EMBODIMENTS

Now, an embodiment of the present invention will be described below in detail with reference to the accompanying drawings. Note that, when the following description refers to the physical downlink control channel (PDCCH: Physical Downlink Control Channel), this will cover the enhanced physical downlink control channel (EPDCCH: Enhanced PDCCH) as well. Also, when the following description mentions that a channel (the PUCCH, the PDCCH and/or the like) is transmitted/received, this will mean that signals are transmitted/received via that channel. Also, when the following description simply refers to the uplink and the downlink, these will mean uplink channels and downlink channels, respectively.

In the LTE-A system, a HetNet (Heterogeneous Network), in which small cells, each having local a coverage area of a radius of approximately several tens of meters, are formed within a macro cell having a wide coverage area of a radius of approximately several kilometers, is under study. Carrier aggregation (CA) and dual connectivity (DC) are applied to the HetNet structure. Note that these may be applied to other network structures as well.

In the HetNet structure, a scenario to place small cells densely is under study in order to support further growth of traffic. In this scenario, it is preferable to secure coverage by using a carrier of a relatively low frequency band in the macro cell, and secure a wide band by using a carrier of a relatively high frequency band in the small cells. In the macro cell layer, wide coverage and mobility are secured by establishing a control plane (C (Control)-plane) connection and supporting high transmission power density in a low frequency band. On the other hand, in the dense small cell layer, a user plane (U (User)-plane) connection, which is specifically for data, is established, so that capacity is secured in a high frequency band and the throughput increases. Note that a small cell may be referred to as a phantom cell, a pico cell, a nano cell, a femto cell, a micro cell and so on.

Figures 1A, 1B:
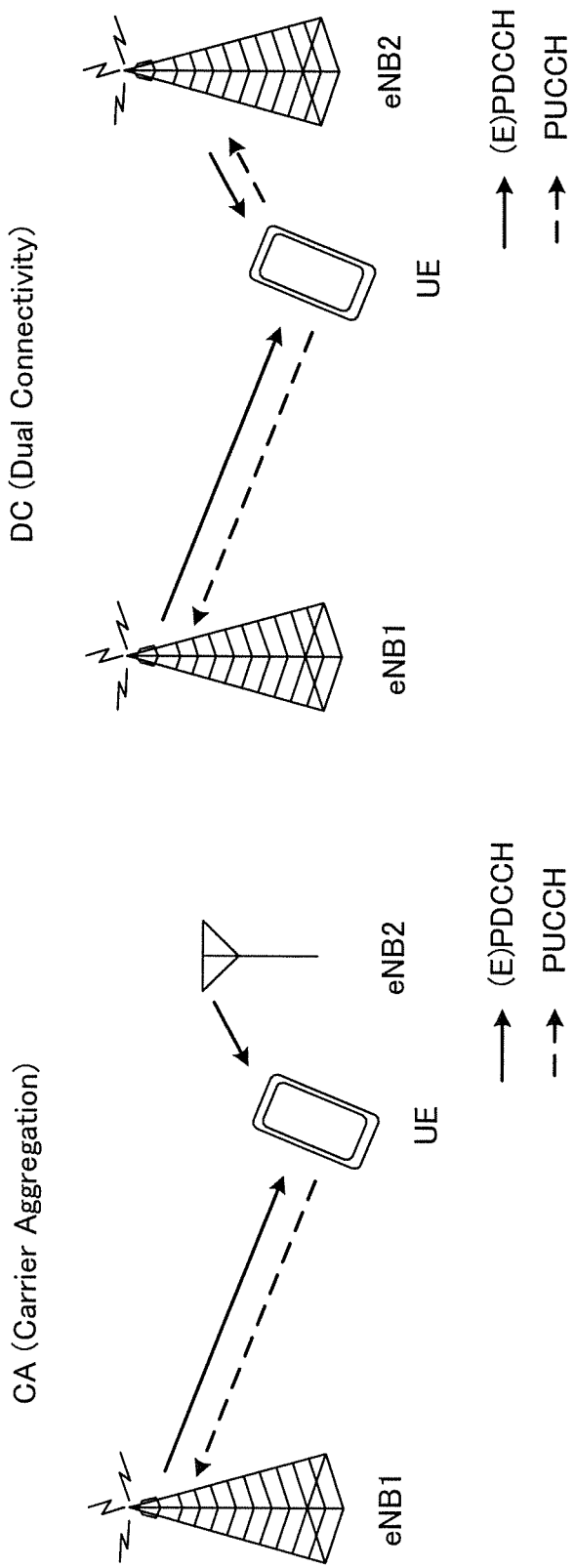
FIG. 1A provides a schematic diagram of carrier aggregation (CA)
FIG. 1B provides a schematic diagram of dual connectivity (DC)

FIGS. 1A and 1B provide schematic diagrams of carrier aggregation (CA) and dual connectivity (DC). A user terminal UE communicates with radio base stations eNB1 and eNB2. FIGS. 1A and 1B show control signals that are transmitted/received via a physical downlink control channel (PDCCH: Physical Downlink Control Channel) and a physical uplink control channel (PUCCH: Physical Uplink Control Channel), respectively. For example, downlink control information (DCI) is transmitted via the PDCCH. Also, uplink control information (UCI) is transmitted via the PUCCH. Note that the DCI that is transmitted via the PDCCH may be referred to simply as downlink control signals (PDCCH signal), and the UCI that is transmitted via the PUCCH may be referred to simply as uplink control signals (PUCCH signal).

FIG. 1A shows communication by eNB1, eNB2 and a UE, which are engaged in CA. In FIG. 1A, for example, eNB1 is a radio base station to form a macro cell (hereinafter referred to as the "macro base station") and eNB2 is a radio base station to form a small cell (hereinafter referred to as the "small base station"), but this structure is by no means limiting. For example, the small base station may be structured like an RRH (Remote Radio Head) that is connected with the macro base station. When CA is employed, one scheduler (for example, the scheduler provided in the macro base station eNB1) controls the scheduling of multiple cells. From this, CA (Rel. 10/11 CA) may be referred to as intra-base station CA (intra-eNB CA), but hereinafter will be referred to simply as "CA."

This structure assumes that the base stations are connected with a high-speed channel (also referred to as an "ideal backhaul") such as optical fiber. Consequently, the UE has only to transmit UCI pertaining to each cell via the PUCCH of one cell (for example, the PCell). For example, HARQ (Hybrid Automatic Repeat reQuest) delivery acknowledgment response signals (also referred to as "retransmission control signals") in response to the PDSCH signals transmitted in the PCell (macro cell) and the SCell (small cell) are aggregated and allocated to the PCell's PUCCH resources. In this case, it is not necessary to transmit a plurality of acknowledgment response signals at the same time, so that it becomes easy to secure uplink coverage.

Meanwhile, FIG. 1B shows communication by eNB1, eNB2 and a UE, which are engaged in DC. In FIG. 1B, for example, eNB1 and eNB2 are macro base stations, but this structure is by no means limiting. When DC is employed, a plurality of schedulers are provided separately, and these multiple schedulers (for example, the scheduler provided in the macro base station eNB1 and the scheduler provided in the macro base station eNB2) control the scheduling of one or more pertaining cells. From this, DC may be referred to as inter-base-station CA (inter-eNB CA).

This structure assumes connecting between the base stations via a non-ideal backhaul, which produces delays that cannot be neglected. For example, the X2 interface may be used for the connection. Consequently, the UE needs to feed back, for every base station, UCI pertaining to the cell formed by that base station. That is, the UE needs to allocate the PUCCH to radio resources of at least one SCell, in addition to the PCell, and send UCI feedback (PUCCH on SCell). In this way, in DC, a UE has to transmit the PUCCH in at least two cells, but this gives a characteristic that an effect of improving throughput is provided, as in CA, without connecting between cells with an ideal backhaul.

Figure 2:
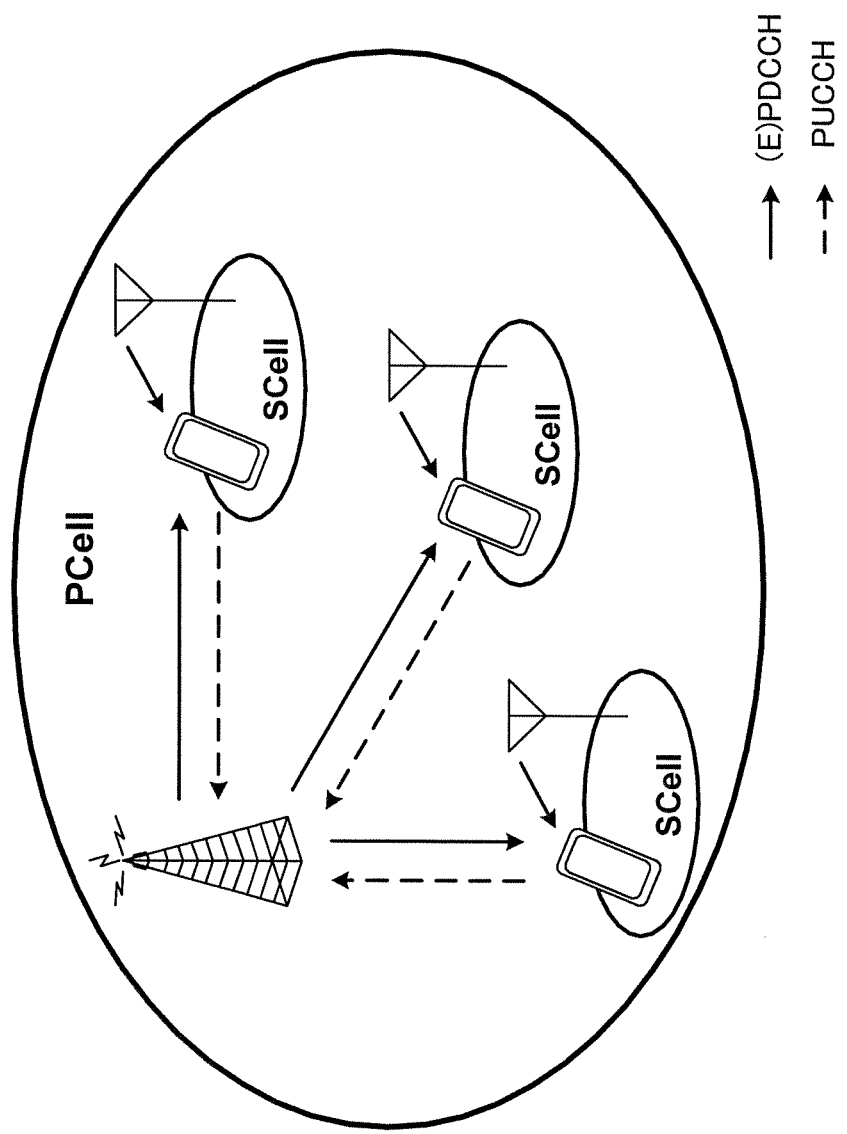
FIG. 2 is a schematic diagram of a deployment scenario 4 in carrier aggregation.

In CA, too, a study is in progress to allocate the PUCCH to SCells, as in DC. This will be described with reference to FIG. 2. FIG. 2 is a schematic diagram of a deployment scenario 4 in CA. In FIG. 2, the macro cell is the PCell and the small cells are SCells. In accordance with CA deployment scenario 4 (deployment scenario #4), a structure is provided in which the macro cell's coverage is secured in a frequency F1, and the macro cell's traffic is off-loaded to the small cells formed by RRHs (Remote Radio Heads) in a frequency F2 (F1<F2). This structure makes it possible to achieve the effects of securing mobility with the macro cell and increasing capacity with the small cells.

However, as mentioned earlier, UCI feedback using the PUCCH can be sent only via the PCell in CA, and therefore the traffic pertaining to UCI feedback in the uplink of the macro cell grows as the number of small cells increases in deployment scenario 4. This may give a threat that the PUCCH makes the macro cell's uplink resources scarce, and places a limitation on the effect of increasing capacity with the small cells.

So, by allocating the PUCCH to SCells as in DC, in CA deployment scenario 4, a user terminal becomes capable of off-loading UCI feedback to the small cells. However, in order to make this possible, the user terminal needs to be able to use uplink CA (UL-CA).

Figures 3A, 3B:
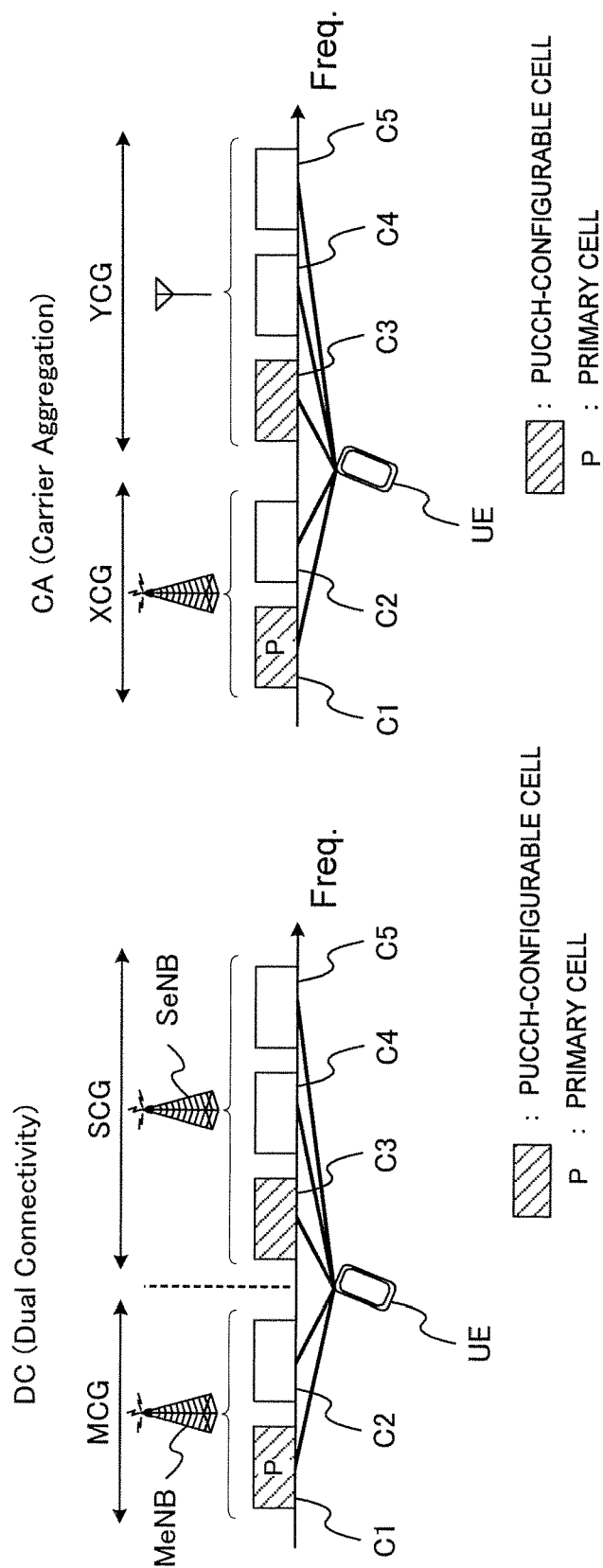
FIG. 3A provides a diagram to show an example of PUCCH allocation to SCells.
FIG. 3B provides a diagram to show another example of PUCCH allocation to SCells.

Considering the cost of devices and the feasibility of implementation, it is preferable to determine the allocation of the PUCCH to SCells in accordance with rules that are common between CA and DC. Now, the allocation of the PUCCH to SCells will be described with reference to FIGS. 3A and 3B. FIGS. 3A and 3B provide diagrams to show examples of PUCCH allocation to SCells in DC or in CA. In FIGS. 3A and 3B, the horizontal axis represents frequency, and five cells to use radio resources of predetermined frequency bands and a user terminal UE are shown connected.

Note that, hereinafter, a cell that is configured so that the PUCCH can be allocated will be referred to as a "PUCCH-configurable cell." Also, an SCell that is configured so that the PUCCH can be allocated will be referred to as a "PUCCH-configurable SCell." Also, an SCell that is not configured so that the PUCCH can be allocated will be referred to as a "PUCCH non-configurable SCell." PUCCH-configurable cells may include both PCells and PUCCH-configurable SCells.

FIG. 3A is a diagram to show an example of PUCCH allocation to SCells in DC. In DC, each radio base station configures a cell group (CG) that is formed with one cell or a plurality of cells. Each CG is likely to be constituted with one or more cells that are formed by the same radio base station or with one or more cells that are formed by the same transmission point (transmitting antenna device, transmission station, etc.), but the actual operation is by no means limited to this. The CG to include the PCell will be referred to as the "master cell group (MCG)," and CGs other than the MCG will be referred to as "secondary cell groups (SCGs)." Also, although two or more cells can execute CA in each CG, the total number of cells to constitute the MCG and SCGs is configured to be equal to or less than a predetermined value (for example, five cells). This predetermined value may be determined in advance, or may be configured dynamically between eNBs and UEs. Also, depending on the implementation of UEs, the total number of cells to constitute the MCG and SCGs, the combination of cells and so on that can be configured may be reported to the eNBs, in the form of capability signaling. Also, the radio base station where the MCG is configured will be referred to as the "master base station (MeNB)," and the radio base station where an SCG is configured will be referred to as a "secondary base station (SeNB)."

In FIG. 3A, a UE is connected with five cells (C1 to C5). C1 is the PCell, and C2 to C5 are SCells. Also, C1 and C2 constitute the MCG, and C3 to C5 constitute an SCG. Also, the frequencies used in the cells are C1, C2, C3, C4 and C5, in ascending order.

In each CG, at least one cell is configured to be able to send PUCCH feedback. In FIG. 3A, C1, which is the PCell, is configured as the PUCCH-configurable cell of the MCG, and C3 is configured as the PUCCH-configurable cell of the SCG. That is, UCI feedback using the PUCCH of the MCG is sent in the PCell (C1), and UCI feedback using the PUCCH of the SCG is sent in the PUCCH-configurable SCell (C3). Note that, when uplink PUSCH transmission is commanded, the UE can multiplex and transmit UCI on the PUSCH as well. That is, UCI feedback using the PUSCH is not limited to PUCCH-configurable cells.

Meanwhile, FIG. 3B is a diagram to show an example of PUCCH allocation to SCells in CA. As described above, from the perspective of allocating the PUCCH based on rules that are common between CA and DC, in CA, too, each radio base station configures a CG that is formed with one cell or a plurality of cells. Each CG is likely to be constituted with one or more cells that are formed by the same radio base station or with one or more cells that are formed by the same transmission point (transmitting antenna device, transmission station, etc.), but the actual operation is by no means limited to this. Hereinafter, the CG to include the PCell in CA will be referred to as the "XCG," and CGs other than the XCG will be referred to as "YCGs." Nevertheless, these names are by no means limiting. Also, a structure is employed here in which two or more cells can execute CA in each CG, but the total number of cells constituting the XCG and YCGs is configured to be equal to or less than a predetermined value (for example, five cells). This predetermined value may be determined in advance, or may be configured dynamically between eNBs and UEs.

The cell structure in FIG. 3B is the same as that of FIG. 3A except that the XCG and the YCG correspond to the MCG and the SCG in FIG. 3A, respectively. In each CG, at least one cell is configured to be able to send PUCCH feedback. In FIG. 3B, C1, which is the PCell, is configured as the cell where the XCG's PUCCH can be allocated, and furthermore C3 is configured as the cell where the YCG's PUCCH can be allocated. That is, C1 and C3 are PUCCH-configurable cells, and the UCI feedback of the XCG is sent in the PCell (C1), and the UCI feedback of the YCG is sent in the PUCCH-configurable SCell (C3). Note that, when uplink PUSCH transmission is commanded, the UE can multiplex and transmit UCI on the PUSCH as well. That is, UCI feedback using the PUSCH is not limited to PUCCH-configurable cells.

Note that information about the PUCCH-configurable cells is reported from the radio base stations to the user terminal via higher layer signaling (for example, RRC signaling, broadcast signals, etc.). Also, information about the CGs may be reported via higher layer signaling as well. To be more specific, information about the cells or the CGs to feed back UCI via the PCell's PUCCH, or information about the cells or the CGs to feed back UCI via the SCell's PUCCH may be reported to the user terminal. For example, FIG. 3B shows an example case where configuration is provided so that, in CA, the PUCCH is transmitted in one SCell, in addition to the PCell, and UCI for two cells (that is, the XCG) is fed back in the PCell's PUCCH and UCI for three cells (that is, the YCG) is fed back in the SCell's PUCCH.

Now, in the radio communication systems of LTE Rel. 10 and later versions, cross-carrier scheduling (CCS) is introduced in CA, whereby DCI pertaining to cells that transmit/receive signals using a shared data channel (PDSCH/PUSCH) is reported via a control channel (PDCCH) that is allocated to another cell. For example, PDSCH/PUSCH transmitting/receiving commands for a cell C2 can be sent in the PDCCH of a cell C1. By using CCS, it becomes possible to transmit/receive control signals by using the PCell or an SCell of high reliability among a plurality of cells. Note that CCS itself may be configured from higher layers and the cells to be scheduled by CCS are determined on a dynamic basis.

Figure 4B:
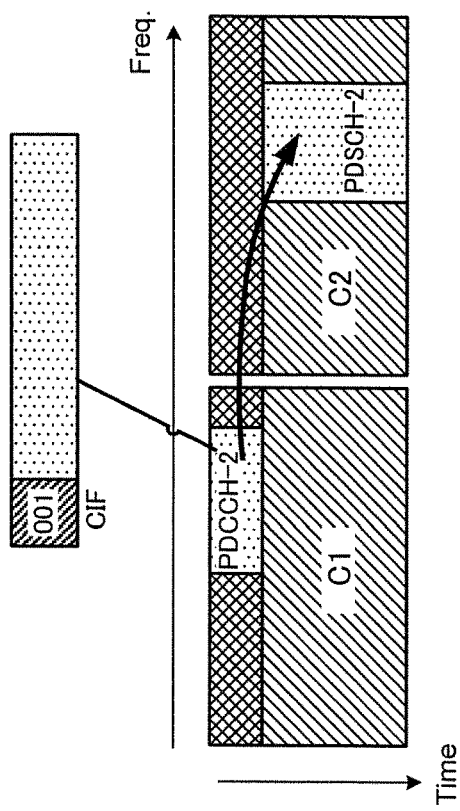
FIG. 4B provides a diagram to show another example of cross-carrier scheduling (CCS)
Figure 4A:
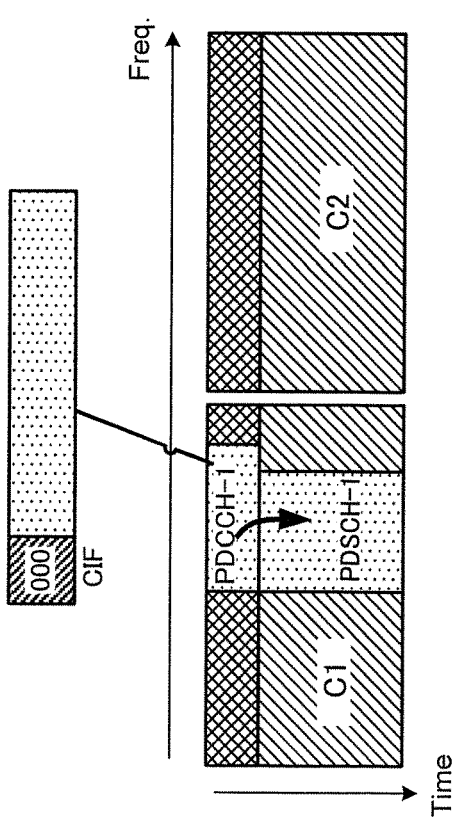
FIG. 4A provides a diagram to show an example of cross-carrier scheduling (CCS)

Examples of CCS will be described with reference to FIGS. 4A and 4B. In FIGS. 4A and 4B, a PDSCH-1 is allocated to cell C1, and a PDSCH-2 is allocated to another cell C2. A PDCCH-1, which provides control information for decoding PDSCH-1, is sent in the same C1 with PDSCH-1 (FIG. 4A). Meanwhile, a PDCCH-2, which provides control information for decoding PDSCH-2, is sent in C1, which is different from that of PDSCH-2 (FIG. 4B). Also, PDCCH-1 and PDCCH-2 each include a CIF (Carrier Indicator Field). The CIF is a bit field for configuring carrier indicators (CI), which specify the cells (CCs) to be scheduled in CCS, in DCI.

In DC, too, application of CCS is under study, as in CA. In CA, radio base stations (that is, CGs) are connected via an ideal backhaul, so that CCS to span over CGs can be configured. Meanwhile, in DC, CGs are connected via a non-ideal backhaul, and there is therefore a threat that CCS to span over CGs does not work in an effective manner, due to delays. Here, CCS to span over CGs means CCS in which scheduling pertaining to cells belonging to different CGs from the CG where the cell having received the PDCCH belongs is shown. This, in other words, means CCS that is used when the cell to transmit/receive the PDCCH and the cell to demodulate the PDSCH by using this PDCCH (the cell specified in the CIF included in the PDCCH) belong to different CGs.

As described earlier, either in DC or in CA, a system to employ CCS and PUCCH on SCell at the same time may be possible. To be more specific, in DC, PUCCH on SCell is essential, and, furthermore, CCS may be employed for load balancing of the PDCCH. Also, although PUCCH on SCell is not essential in CA, there is nevertheless a possibility that PUCCH on SCell is configured for the purpose of allowing load balancing of the PUCCH, and, furthermore, there is a possibility that CCS is employed in order to allow load balancing of the PDCCH.

However, in CA or in DC, the operation for when CCS and PUCCH on SCell are employed at the same time have not been stipulated. To be more specific, when a user terminal detects a PDCCH to command CCS, the user terminal needs to transmit the PUCCH from at least one PUCCH-configurable cell, but how PUCCH resources should be allocated has never been stipulated. Consequently, if the PUCCH resources for sending UCI feedback in response to CCS cannot be determined, there is a threat of causing a decrease in overall system performance.

Figure 5:
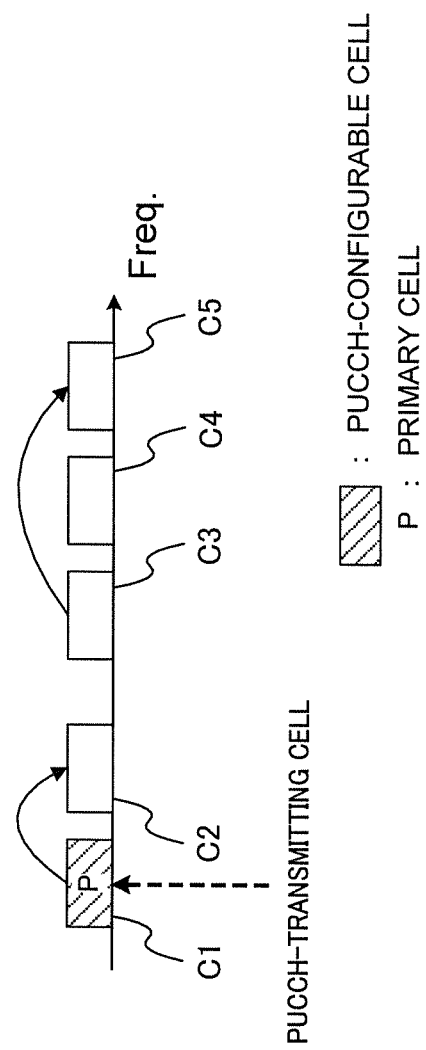
FIG. 5 is a diagram to show an example of CCS that is presumed in conventional CA.
Figure 6B:
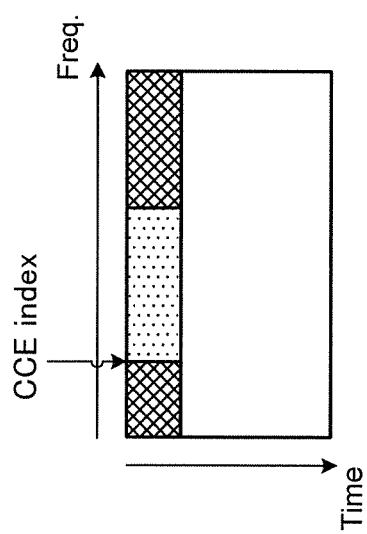
FIG. 6B provides a diagram to show another example of parameters of the PDCCH/EPDCCH for use in allocating PUCCH resources when CCS is configured.
Figure 6A:
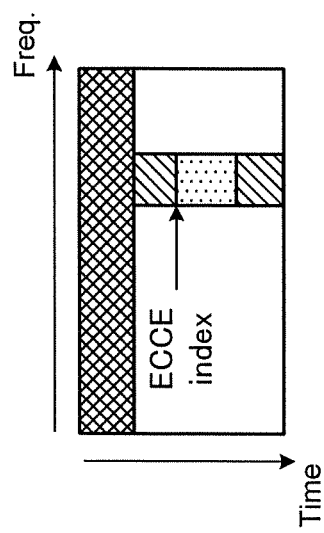
FIG. 6A provides a diagram to show an example of parameters of the PDCCH/EPDCCH for use in allocating PUCCH resources when CCS is configured.

The problem in this case will be described in detail with reference to FIGS. 5, 6A, and 6B. FIG. 5 is a diagram to show an example of CCS that is presumed in conventional CA. FIG. 6 is a diagram to show examples of the parameters of the PDCCH/EPDCCH for use in PUCCH resource allocation when CCS is configured. In conventional CA, the PUCCH is transmitted in the PCell alone. Consequently, in FIG. 5, the PCell (C1) is the PUCCH-transmitting cell. In the event of CCS from the PCell to an SCell, like CCS from C1 to C2, the PUCCH resource for the PUCCH-transmitting cell is determined based on the minimum CCE (Control Channel Element)/ECCE (Enhanced CCE) index that is found in PDCCH/EPDCCH detection. FIG. 6A is shows an example of the minimum CCE index, and FIG. 6B shows an example of the minimum ECCE index.

For example, the PUCCH resource in PUCCH format 1a/1b is determined based on following equation 1 in the event of the PDCCH or based on following equation 2 in the event of the EPDCCH (distributed transmission).

[1]

$$n_{PUCCH,j}^{(1)} = n_{CCE} + n_{PUCCH}^{(1)} \quad \text{(Equation 1)}$$

$$n_{PUCCH,j}^{(1)} = n_{ECCE,q} + \Delta_{ARO} + n_{PUCCH,q}^{(e1)} \quad \text{(Equation 2)}$$

where $n_{CCE}$ is the minimum CCE index for use in corresponding DCI transmission, and $n_{PUCCH}^{(1)}$ is the resource index for PUCCH format 1a/1b. Also, $n_{ECCE,q}$ is the minimum ECCE index for use in corresponding DCI transmission in a resource block set q of the EPDCCH, $\Delta_{ARO}$ is the value that is determined from the ACK/NACK offset field, and $n_{PUCCH,q}^{(e1)}$ is the resource index for PUCCH format 1a/1b corresponding to the resource block set q of the EPDCCH. Note that $n_{PUCCH}^{(1)}$ and $n_{PUCCH,q}^{(e1)}$ are configured by higher layer parameters.

Also, in the event of CCS from an SCell to an SCell, like the CCS from C3 to C5 shown in FIG. 5, the transmit power control (TPC) command bit that is included in the PDCCH/EPDCCH is used as information (ARI: ACK/NACK Resource Indicator) to specify the PUCCH radio resource for retransmission response signals. The PUCCH resource is determined based on this value. To be more specific, dynamic allocation is made, based on ARIs, from candidate PUCCH resources that are configured in advance by higher layers. Also, CCS from an SCell to the PCell is not supported, and not shown in FIG. 5.

As has been shown above, while conventional CA holds the assumption that the PUCCH is transmitted in the PCell alone, there is no stipulation pertaining to the allocation of PUCCH resources in CCS in the event PUCCH transmission is configured in a plurality of cells. Consequently, even when PUCCH transmission is configured in a plurality of cells, HARQ cannot be applied unless the PUCCH resources in CCS cannot be determined, which makes it difficult to achieve high throughput. Consequently, if the PUCCH resources for sending UCI feedback in CCS cannot be determined, there is a threat of causing a decrease of overall system performance.

For the purpose of solving this problem, first, the present inventors have focused on the fact that, considering PUCCH transmission in SCells, CCS may be possible in the following (1) to (6):

(1) CCS from the PCell to a PUCCH-configurable SCell;
(2) CCS from the PCell to a PUCCH-non-configurable SCell;
(3) CCS from a PUCCH-configurable SCell to a PUCCH-configurable SCell;
(4) CCS from a PUCCH-configurable SCell to a PUCCH non-configurable SCell;
(5) CCS from a PUCCH non-configurable SCell to a PUCCH-configurable SCell; and
(6) CCS from a PUCCH non-configurable SCell to a PUCCH non-configurable SCell.

Note that CCS to the PCell is not supported.

Also, the present inventors have focused on the fact that a PUCCH-configurable cell feeds back other SCells' UCI, in addition to the subject cell's UCI. For example, in the example of FIG. 3B, it may occur that the UCI of C1 and C2 is transmitted in the PCell (C1) and the UCI of C3, C4 and C5 is transmitted in a PUCCH-configurable SCell (C3).

Based on these points of view, the present inventors have come up with the idea of adequately stipulating the operation for when CCS and PUCCH on SCell are configured in a system in which a plurality of radio base stations and user terminals communicate using CA or DC.

To be more specific, the present inventors have come up with the idea of deciding whether or not the PDCCH-receiving cell (the cell in which a user terminal receives a PDCCH to report CCS) and the cell to transmit the PUCCH, which is selected from PUCCH-configurable cells, are the same, and changing the method of determining the resource to allocate to the PUCCH based on this decision. According to this structure, when communication is carried out in a plurality of CGs, it is possible to enhance the cell to serve as the PCell in the allocation of PUCCH resources when conventional CCS is configured, to a PUCCH-configurable cell, which may as well be a PUCCH-configurable SCell. Consequently, it becomes possible to adequately determine the resource to transmit the PUCCH, and reduce the decrease in overall system performance.

Now, a radio communication method according to an embodiment of the present invention (hereafter referred to as "the present embodiment") will be described in detail below. Note that, in the present embodiment, a user terminal is structured to select the cell to transmit the PUCCH, from PUCCH-configurable cells, a PDCCH to report CCS is detected. The cell to transmit the PUCCH when a PDCCH to report CCS will be hereinafter referred to as the "PUCCH-transmitting cell." Note that, while each CG's PUCCH-configurable cell can be the PUCCH-transmitting cell when CCS to span over CGs is detected, if CCS that does not span over CGs is detected, the PUCCH-configurable cell of the CG where the CCS is detected may be the PUCCH-transmitting cell.

The radio communication method according to the present embodiment is applied, roughly, to the case where CCS to indicate scheduling for one cell is received (referred to as "example 1") and to the case where CCS to indicate scheduling for a plurality of cells is received (referred to as "example 2"). Each example will be described below in detail. Note that, according to the present embodiment, scheduling that is shown with the CIF will be referred to as "CCS," and, even when scheduling encompasses the same cell (carrier), this still will be referred to as "CCS" (example 1).

Example 1

An example 1 of the radio communication method according to the present embodiment stipulates the allocation of PUCCH resources in the event CCS to indicate scheduling for one cell is received. In example 1, a PUCCH signal to include one piece of UCI is transmitted from one PUCCH-transmitting cell. The UCI to feed back may be, for example, an acknowledgement response signal such as a positive response (ACK: Acknowledgement), a negative response (NACK: Negative ACK) and so on, but other signals (for example, channel quality information (CQI: Channel Quality Information) and so on) may be fed back as well.

In example 1, when a user terminal decides that the PDCCH-receiving cell and the PUCCH-transmitting cell are the same (the decision is true), the user terminal allocates the PUCCH resource based on higher layer parameters and the CCE index of the PUCCH (or the ECCE index in the event of the EPDCCH) where the DCI is allocated. In this case, PUCCH resource can be calculated according to, for example, above equation 1. Hereinafter, whenever a CCE index is mentioned, this may as well be an ECCE index of the EPDCCH.

On the other hand, when a user terminal decides that the PDCCH-receiving cell and the PUCCH-transmitting cell are different (the decision is false), the user terminal allocates the PUCCH resource based on higher layer parameters and the ARI that is included in the DCI. In this case, the PUCCH resource can be calculated according to, for example, above equation 2.

Note that, when information to indicate a plurality of cross-carrier scheduling is included in a downlink control signal, the user terminal decides whether or not the cell having received the downlink control signal and the cell to transmit an uplink control signal, which is selected per cell that is designated by the information to indicate cross carrier scheduling, are the same, and, based on this decision, selects the resource to allocate to the uplink control signal. The same holds with example 2, which will be described later.

Figure 7:
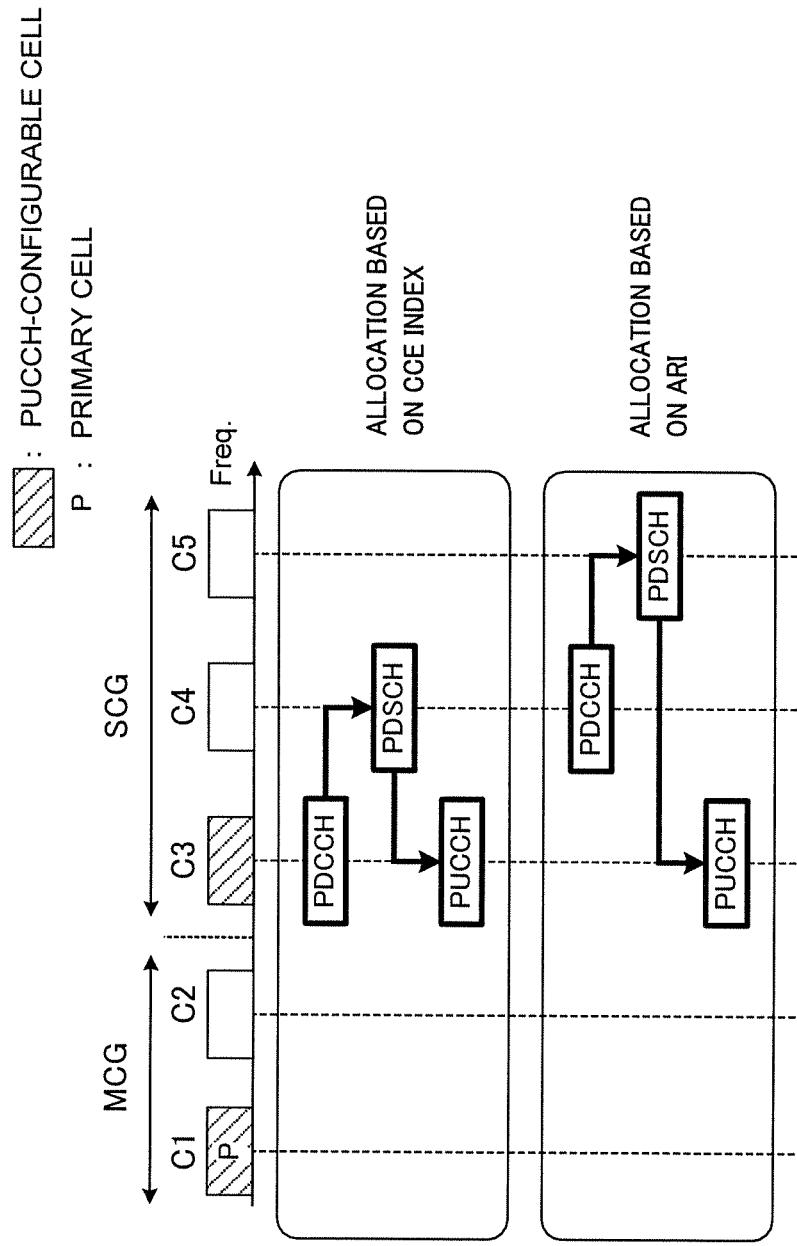
FIG. 7 is a diagram to show an example of PUCCH resource allocation, according to a first example 1, in the event CCS that does not span over CGs is detected.

FIG. 7 is a diagram to show an example of PUCCH resource allocation, according to example 1, in the event CCS that does not span over CGs is detected. The upper part of FIG. 7 shows the structure of cells and CGs. Also, the middle part and the lower part of FIG. 7 show time sequences of processes in user terminals in the event the PDCCH-receiving cell and the PUCCH-transmitting cell are the same and are different.

Note that the structures of cells and CGs that are shown in the upper parts of FIGS. 7 to 13, which will be described later, are the same as the structure shown in FIG. 3A. However, the structure to which the radio communication method according to the present embodiment is applied is not limited to this, and the radio communication method according to the present embodiment may be applied to other DC structures or CA structures. That is, the MCGs and SCGs shown in FIGS. 7 to 13 may be the XCG and the YCG shown in FIG. 3B, or may be formed by combining other CGs. Also, the middle parts and the lower parts of FIGS. 7 to 13 are the same in showing time sequences of processes in user terminals in the event the PDCCH-receiving cell and the PUCCH-transmitting cell are the same or are different. Also, FIGS. 7 to 13 show examples in which the cell group to include the PDCCH-receiving cell is an SCG, and, even if the SCG and MCG are switched in each drawing, this only results in drawings that are the same as the original ones except that the CGs are different.

The middle part of FIG. 7 shows an example in which a user terminal receives, in C3, a PDCCH to indicate CCS to C4, decodes, in C4, the PDSCH that is scheduled based on the CCS, and transmits, in C3, a PUCCH in response to that PDSCH. In this case, the PDCCH-receiving cell and the PUCCH-transmitting cell are the same, so that CCE index-based allocation is executed.

Also, the lower part of FIG. 7 shows an example in which a user terminal receives, in C4, a PDCCH to indicate CCS to C5, decodes, in C5, the PDSCH that is scheduled on the CCS, and transmits, in C3, a PUCCH in response to that PDSCH. In this case, the PDCCH-receiving cell and the PUCCH-transmitting cell are different, so that ARI-based allocation is executed.

Figure 8:
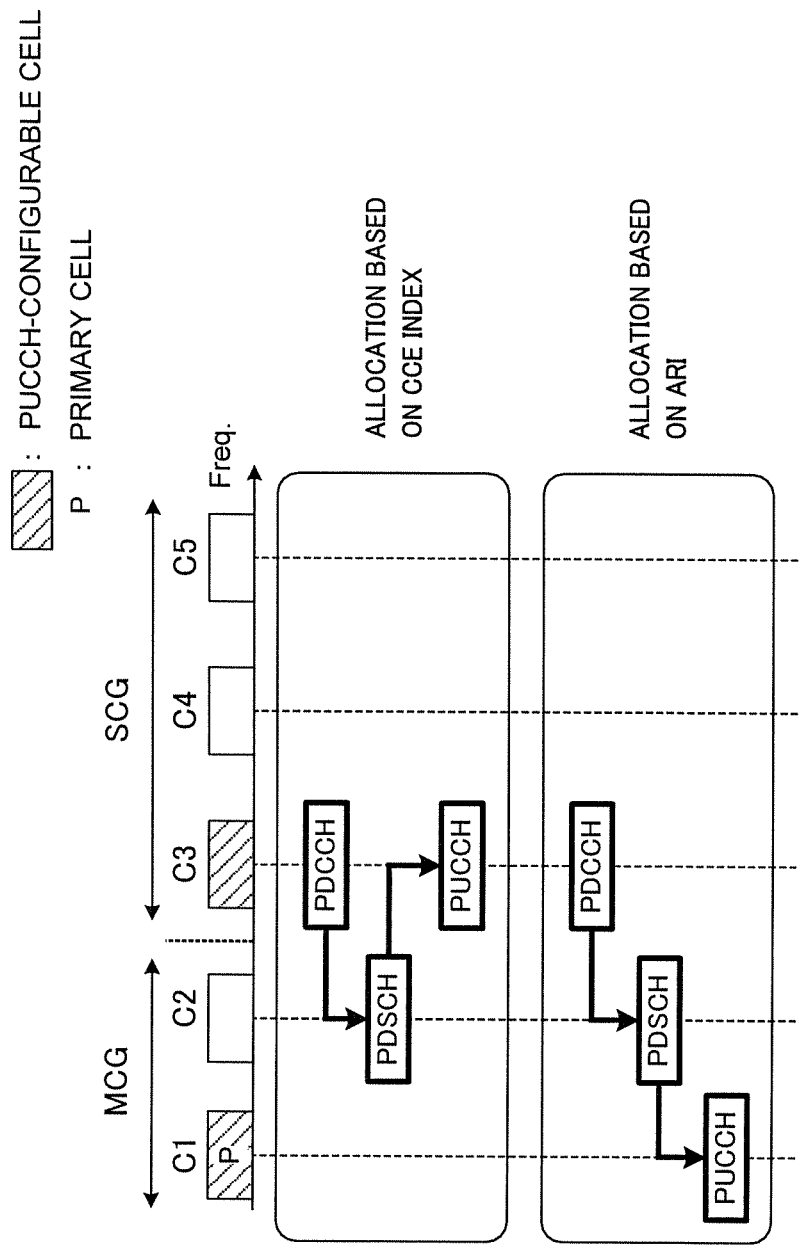
FIG. 8 is a diagram to show an example of PUCCH resource allocation, according to the first example, in the event CCS that spans over CGs is detected.

FIG. 8 is a diagram to show an example of PUCCH resource allocation, according to example 1, in the event CCS to span over CGs is detected. The middle part of FIG. 8 shows an example in which a user terminal, receives, in C3, a PDCCH to indicate CCS to C2, decodes, in C2, the PDSCH that is scheduled based on the CCS, and transmits, in C3, a PUCCH in response to that PDSCH. In this case, the PDCCH-receiving cell and the PUCCH-transmitting cell are the same, so that CCE index-based allocation is executed.

Also, the lower part of FIG. 8 shows an example in which a user terminal receives, in C3, a PDCCH to indicate CCS to C2, decodes, in C2, the PDSCH that is scheduled based on the CCS, and transmits, in C1, a PUCCH in response to that PDSCH. In this case, the PDCCH-receiving cell and the PUCCH-transmitting cell are different, so that ARI-based allocation is executed.

As described above, with example 1 of the radio communication method according to the present embodiment, when CCS and PUCCH on SCell are configured in a radio communication system in which DC or CA is employed, whether or not the PDCCH-receiving cell and the PUCCH-transmitting cell are the same is decided, and, based on this decision, the method of determining the resource to allocate to the PUCCH is changed. This structure provides a remarkable advantage of preventing collisions of PUCCH resources, without relying on the number of CGs, the structure of PUCCH-configurable cells and so on. To be more specific, DCI is mapped to varying CCE indices between user terminals to which DL assignments are transmitted in the same PDCCH, so that it is possible to prevent collisions of PUCCH resources. Also, in still other cases, too, PUCCH resources that are configured by higher layers can be specified with ARIs on a dynamic basis, so that it is possible to prevent collisions of PUCCH resources.

Also, the radio communication method according to the present embodiment, being similar to the mechanism of conventional CCS that is employed in CA, entails little cost of implementation and can be introduced quickly. Also, in a system where CCS and PUCCH on SCell are configured at the same time, it is possible to operate the PUCCH adequately, so that adequate PUCCH load balancing and PDCCH interference control are possible.

Note that, when the PDSCH-receiving cell and the PUCCH-transmitting cell are the same, in addition to the determining method of determining the resource to allocate to the PUCCH depending on whether or not the PDCCH-receiving cell and the PUCCH-transmitting cell are the same, it is also possible to determine the resource to allocate to the PUCCH based on whether or not the PDSCH-receiving cell and the PUCCH-transmitting cell are the same, To be more specific, when the PDSCH-receiving cell and the PUCCH-transmitting cell are the same, it is equally possible to use the method of determining the resource to allocate to the PUCCH based, instead of the ARI, on the radio resource index where the PDSCH is received and/or the antenna port number of the reference signal (demodulation reference signal) that is required to demodulate the PDSCH.

In other words, if the above-noted decision is false, whether or not the cell that is specified by the information to indicate cross-carrier scheduling and the cell to transmit an uplink control signal are the same is furthermore decided. Then, if the decision is true, it may be possible to determine the radio resource to allocate to the uplink control signal based, instead of the ARI, on information related to a downlink shared data channel received in the cell that is specified by the above-noted information indicating cross-carrier scheduling. For the information related to the downlink shared data channel, for example, the radio resource index of the downlink shared data channel and/or the antenna port number of the demodulation reference signal for the downlink shared data channel can be used.

There is little possibility that data for varying user terminals is space-multiplexed in each cell's PDSCH, so that it is possible to prevent collisions of PUCCH resources between user terminals by allocating PUCCH resources based on PDSCH radio resource indices. When data for varying user terminal is space-multiplexed and PUCCH resources are allocated only to PDSCH radio resources, collisions might occur. However, even in cases like this, the demodulation reference signal antenna port number varies between user terminals, so that it is possible to prevent collisions of PUCCH resources between user terminals by using antenna port numbers in PUCCH resource allocation.

Note that when the PDCCH-receiving cell and the PUCCH-transmitting cell are not the same and the PDSCH-receiving cell and the PUCCH-transmitting cell are the same, whether to use the ARI, the PDSCH radio resource index or the reference signal antenna port number is configured in advance by higher layers. This may be changed depending on the transmission mode, whether or not the EPDCCH is configured and so on. Also, when the PDCCH-receiving cell, the PDSCH-receiving cell and the PUCCH-transmitting cell are all the same, it suffices to allocate the PUCCH resource based on the CCE index of the PDCCH.

Example 2

An example 2 of the radio communication method according to the present embodiment stipulates the allocation of PUCCH resources in the event CCS to indicate scheduling for a plurality of cells is received. Although there are cases in CCS where a plurality of PDSCHs are allocated at the same time, in such cases, the allocation of PUCCH resources is determined according to example 2.

When CCS indicates scheduling for a plurality of cells, in example 2, the decision according to example 1 is made for every cell that is involved in the CCS, and the PUCCH resource for each cell is determined. Here, example 2 may be applied, roughly, to three cases, including: the case where a user terminal transmits a PUCCH signal that contains two cells' UCI from one PUCCH-transmitting cell (example 2.1); the case where a user terminal transmits a PUCCH signal that contains three or more cells' UCI from one PUCCH-transmitting cell (example 2.2); and the case where a user terminal transmits PUCCH signals from two or more PUCCH-transmitting cells at the same time (example 2.3). Note that, whenever example 2 will be mentioned below, this will cover all of example 2.1, example 2.2 and example 2.3.

Example 2.1

Example 2.1 is applied to the case in which a user terminal transmits a PUCCH signal that contains two cells' UCI from one PUCCH-transmitting cell. In this case, channel selection is applied to two PUCCH resources that are determined according to example 1.

Here, channel selection is the method to allow configuring a plurality of radio resources in PUCCH format 1a/1b, and reporting the combinations of retransmission response signals of a plurality of cells by using bit information that is provided by phase modulation (for example, QPSK data modulation) and radio resource selection information. The relationships of these are provided in the form of a mapping table, and, in this mapping table, the number of cells, the transmission mode (that is, the number of transport blocks, the number of codewords and so on) and so on, which are assigned by RRC signaling from higher layers, can be determined. Also, for the PUCCH radio resources to configure in the mapping table (for example, Ch1 to Ch4), OCC (Orthogonal Cover Code), CS (Cyclic Shift) or PRB (Physical Resource Block) indices may be used.

Figure 9:
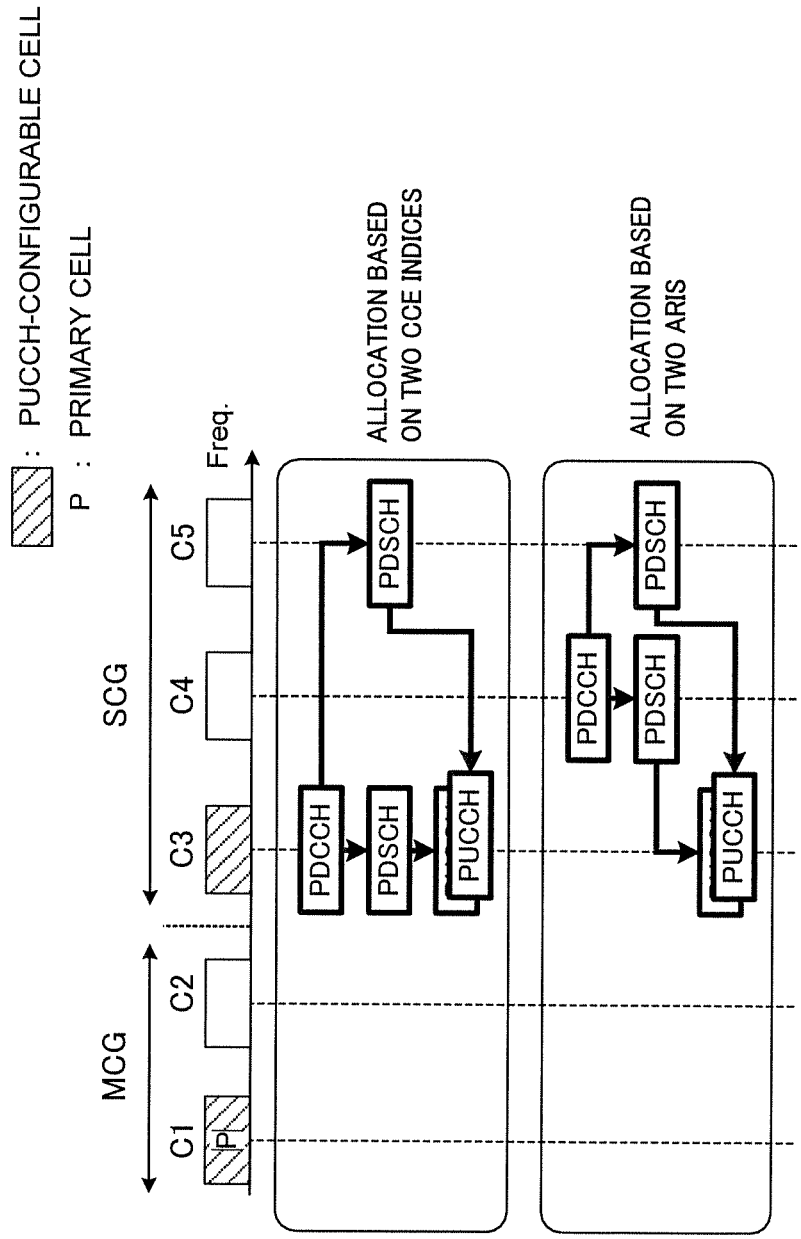
FIG. 9 is a diagram to show an example of PUCCH resource allocation, according to an example 2.1, in the event CCS to two cells, not spanning over CGs, is detected.

FIG. 9 is a diagram to show an example of PUCCH resource allocation, according to example 2.1, in the event CCS to two cells, not spanning over CGs, is detected. The middle part of FIG. 9 shows an example in which a user terminal receives, in C3, a PDCCH to indicate CCS to C3 and C5, decodes, in C3 and C5, the PDSCHs that are scheduled based on the CCS, respectively, and transmits, in C3, PUCCHs in response to the two PDSCHs. According to example 1, CCE index-based allocation is executed when the PDCCH-receiving cell and the PUCCH-transmitting cell are the same, so that the allocation is carried out based on two CCE indices and the PUCCH transmission resources are determined by applying channel selection to the allocated resources.

Also, the lower part of FIG. 9 shows an example in which a user terminal receives, in C4, a PDCCH to indicate CCS to C4 and C5, decodes, in C4 and C5, the PDSCHS that are scheduled based on the CCS, respectively, and transmits, in C3, PUCCHs in response to the two PDSCHs. According to example 1, ARI-based allocation is executed when the PDCCH-receiving cell and the PUCCH-transmitting cell are different, so that the allocation is carried out based on two ARIs, and the PUCCH transmission resources are determined by applying channel selection to the allocated resources.

Figure 10:
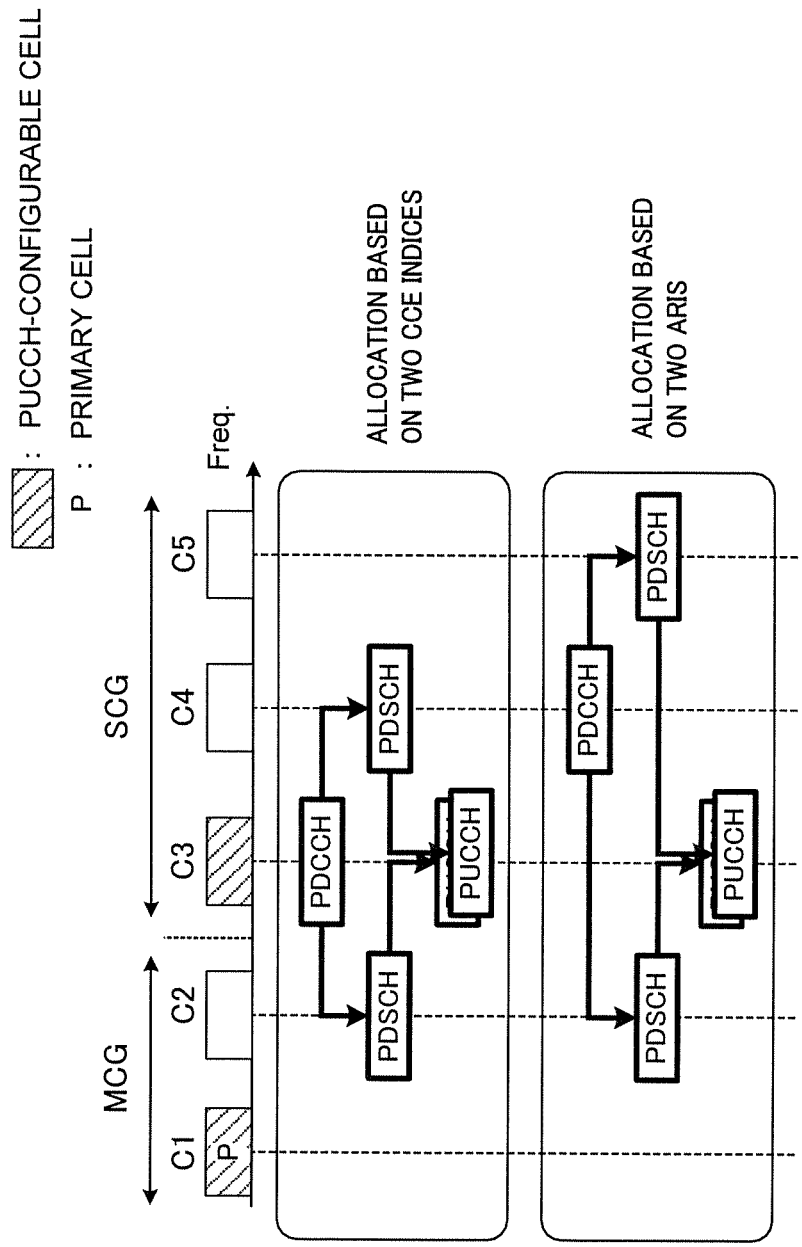
FIG. 10 is a diagram to show an example of PUCCH resource allocation, according to example 2.1 in the event CCS to two cells, spanning over CGs, is detected.

FIG. 10 is a diagram to show an example of PUCCH resource allocation, according to example 2.1, in the event CCS to two cells, including CCS spanning over CGs, is detected. The middle part of FIG. 10 shows an example in which a user terminal receives, in C3, a PDCCH to indicate CCS to C2 and C4, decodes, in C2 and C4, the PDSCHs that are scheduled based on the CCS, respectively, and, transmits, in C3, PUCCHs in response to the two PDSCHs. According to example 1, CCE index-based allocation is executed when the PDCCH-receiving cell and the PUCCH-transmitting cell are the same, so that the allocation is carried out based on the CCE indices where the two PDCCHs are mapped, and the PUCCH transmission resources are determined by applying channel selection to the allocated resources.

Also, the lower part of FIG. 10 shows an example in which a user terminal receives, in C4, a PDCCH to indicate CCS to C2 and C5, decodes, in C2 and C5, the PDSCHs that are scheduled based on the CCS, respectively, and transmits, in C3, PUCCHs in response to the two PDSCHs. According to example 1, ARI-based allocation is executed when the PDCCH-receiving cell and the PUCCH-transmitting cell are different, so that the allocation is carried out based on two ARIs, and the PUCCH transmission resources are determined by applying channel selection to the allocated resources.

Example 2.2

Example 2.2 is applied to the case in which a user terminal transmits a PUCCH signal that contains three or more cells' UCI, from one PUCCH-transmitting cell. In this case, the PUCCH resource is determined by using the TPC command bit as the ARI, and a PUCCH signal structured in PUCCH format 3 is allocated to this resource. According to PUCCH format 3, it is possible to transmit acknowledgement response signals of maximum ten bits in the event of frequency division duplex (FDD) and maximum twenty bits in the event of time division duplex (TDD). The relationship between the ARI and PUCCH resource is reported through higher layer signaling (for example, RRC signaling).

However, according to example 2.2, even when PUCCH format 3 is configured, if only the PDSCH that is allocated for one or two cells is actually received where the user terminal is supposed to receive the PDCCH/PDSCH (for example, when the user terminal has failed receiving the PDCCH), feedback is sent by using PUCCH format 1a/1b in the PUCCH resource that is determined based on the CCE index or the ARI according to the rule of example 1 or example 2.1.

Figure 11:
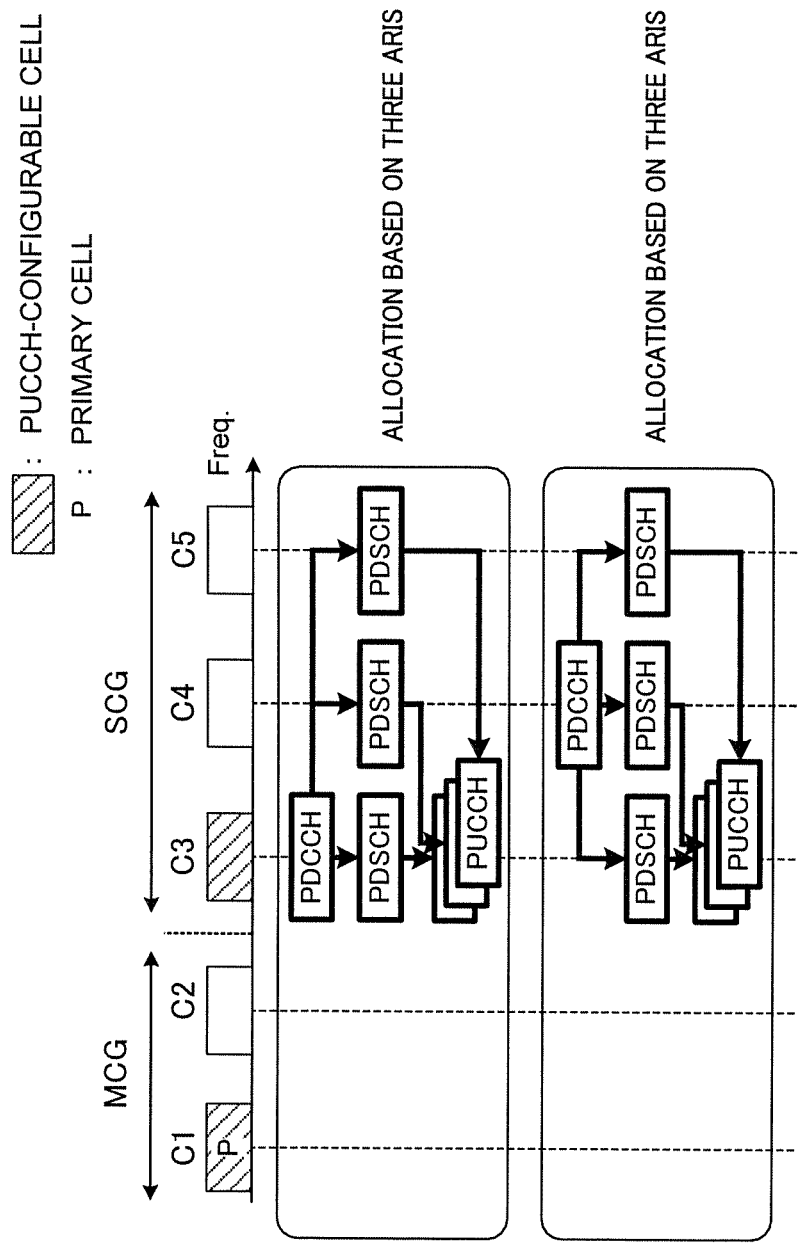
FIG. 11 is a diagram to show an example of PUCCH resource allocation, according to an example 2.2, in the event CCS to three cells, not spanning over CGs, is detected.

FIG. 11 is a diagram to show example of PUCCH resource allocation according to example 2.2 in the event CCS to three cells, not spanning over CGs, is detected. The middle part of FIG. 11 shows an example in which a user terminal receives, in C3, a PDCCH to indicate CCS to C3, C4 and C5, decodes, in C3, C4 and C5, the PDSCHs that are scheduled based on the CCS, respectively, and transmits, in C3, PUCCHs in response to the three PDSCHs. According to PUCCH format 3, the PUCCH resource is determined by using the TPC command bit as the ARI, so that, even when the PDCCH-receiving cell and the PUCCH-transmitting cell are the same, as in example 1, the user terminal determines the PUCCH resources based on the ARIs, and allocates the PUCCH signals structured in PUCCH format 3 to these resources, without carrying out the allocation based on the CCE indices. Also, for example, when the user terminal actually receives only the PDCCH for allocating C4, the user terminal determines the PUCCH transmission resource based on the CCE index where this PDCCH is mapped, and allocates a PUCCH signal structured in PUCCH format 1a/1b to this resource.

Also, the lower part of FIG. 11 shows an example in which a user terminal receives, in C4, a PDCCH to indicate CCS to C3, C4 and C5, decodes, in C3, C4 and C5, the PDSCHs that are scheduled based on the CCS, respectively, and transmits, in C3, PUCCHs in response to the three PDSCHs. The user terminal determines the PUCCH resources based on the ARIs, as mentioned earlier. Also, for example, the user terminal actually receives only the PDCCH for allocating C4, determines the PUCCH transmission resource based on the ARI contained in that PDCCH, and allocates a PUCCH signal structured in PUCCH format 1a/1b to that resource.

Figure 12:
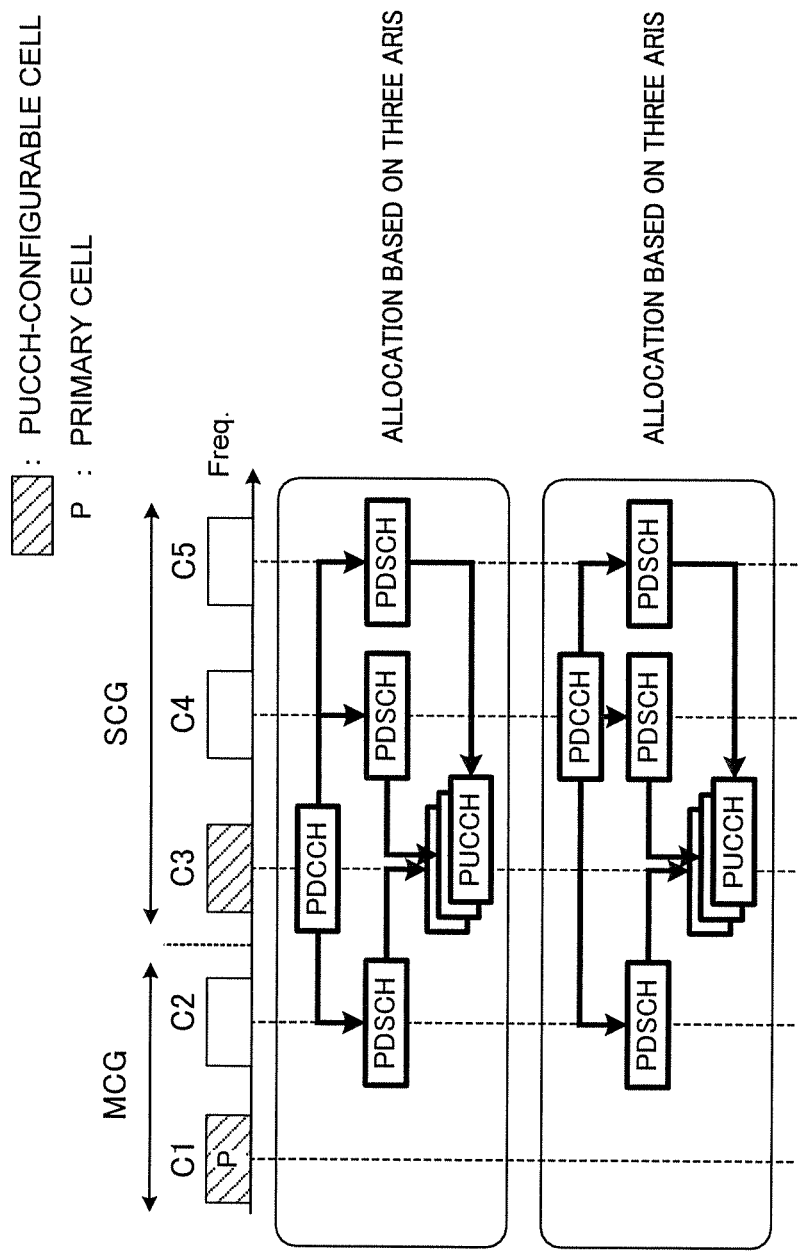
FIG. 12 is a diagram to show an example of PUCCH resource allocation, according to example 2.2, in the event CCS to three cells, spanning over CGs, is detected.

FIG. 12 is a diagram to show an example of PUCCH resource allocation, according to example 2.2, in the event CCS to three cells, spanning over CGs, is detected. The middle part of FIG. 12 shows an example in which a user terminal receives, in C3, a PDCCH to indicate CCS to C2, C4 and C5, decodes, in C2, C4 and C5, the PDSCHS that are scheduled based on the CCS, respectively, and transmits, in C3, PUCCHs in response to the three PDSCHs. The user terminal determines the PUCCH resources based on the ARIs, as mentioned earlier. Also, when, for example, the user terminal actually receives only the PDCCH for allocating C4, determines the PUCCH transmission resource based on the CCE index where this PDCCH is mapped, allocates a PUCCH signal structured in PUCCH format 1a/1b to that resource.

Also, the lower part of FIG. 12 shows an example in which a user terminal receives, in C4, a PDCCH to indicate CCS to C2, C4 and C5, decodes, in C2, C4 and C5, the PDSCHS that are scheduled based on the CCS, respectively, and transmits, in C3, PUCCHs in response to the three PDSCHs. The user terminal determines the PUCCH resources based on the ARIs, as mentioned earlier. Also, for example, when the user terminal actually receives only the PDCCH for allocating C4, the user terminal determines the PUCCH transmission resource based on the ARI contained in that PDCCH, and allocates a PUCCH signal structured in PUCCH format 1a/1b to that resource.

Example 2.3

Example 2.3 is applied to the case where user terminal transmits PUCCH signals from two or more PUCCH-transmitting cells at the same time. Also, the PUCCH resource for each PUCCH-transmitting cell is determined using an appropriate one of example 1, example 2.1 and example 2.2. Then, the PUCCH signals are transmitted using a plurality of radio resources that are determined.

Figure 13:
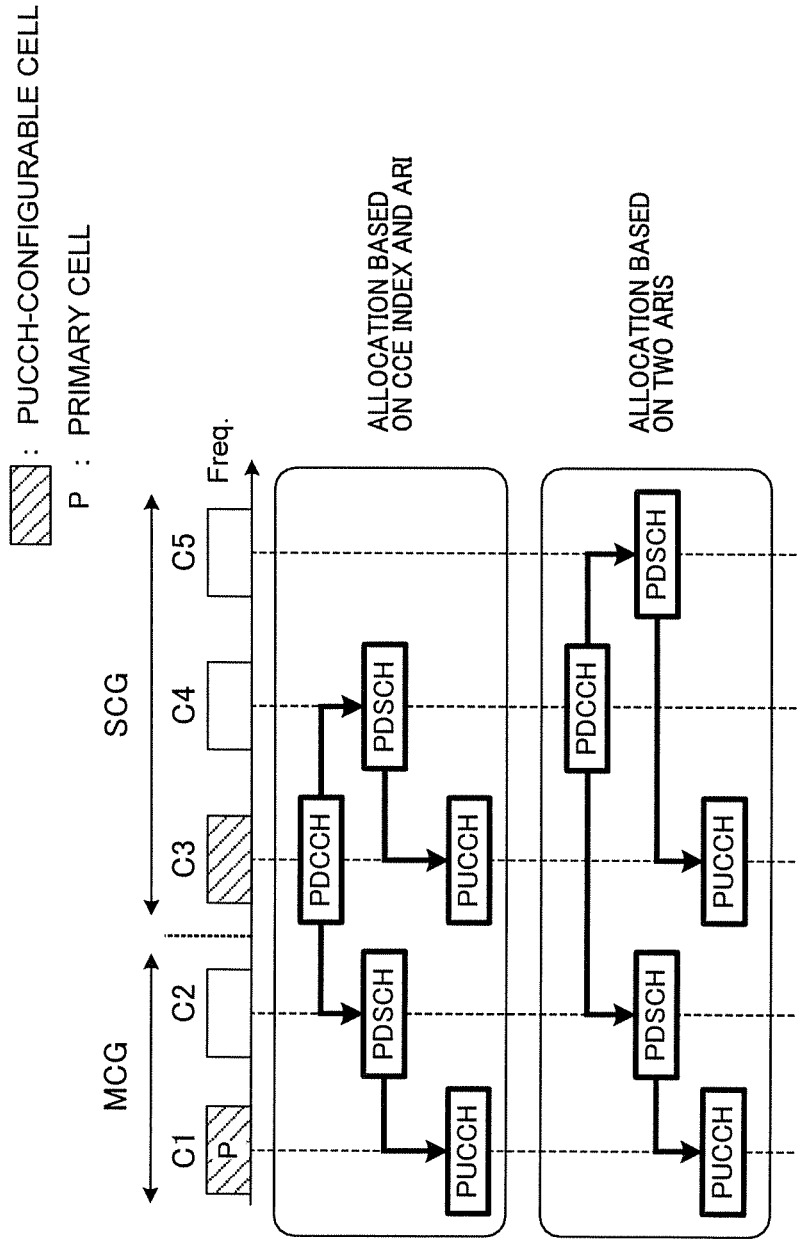
FIG. 13 is a diagram to show an example of PUCCH resource allocation, according to an example 2.3, in the event CCS to two cells is detected.

FIG. 13 is a diagram to show an example of PUCCH resource allocation, according to example 2.3, in the event CCS to two cells is detected. The middle part of FIG. 13 shows an example in which a user terminal receives, in C3, a PDCCH to indicate CCS to C2 and C4, decodes, in C2 and C4, the PDSCHs that are scheduled based on the CCS, respectively, and transmits, in C1 and C3, PUCCHs in response to the PDSCHs, respectively. According to example 1, CCE index-based allocation is carried out when the PDCCH-receiving cell and the PUCCH-transmitting cell are the same, and ARI-based allocation is carried out when the PDCCH-receiving cell and the PUCCH-transmitting cell are different, so that, in C1, the PUCCH transmission resource is determined based on one ARI, and, in C3, the PUCCH transmission resource is determined based on one CCE index. Then, the PUCCH signals are transmitted using the resources determined in C1 and C3, respectively.

Also, the lower part of FIG. 13 shows an example in which a user terminal receives, in C4, a PDCCH to indicate CCS to C2 and C5, decodes, in C2 and C5, the PDSCHs that are scheduled based on the CCS, respectively, and, transmits, in C1 and C3, PUCCHs in response to the PDSCHs, respectively. According to example 1, ARI-based allocation is executed when the PDCCH-receiving cell and the PUCCH-transmitting cell are different, so that, in C1, the PUCCH transmission resource is determined based on one ARI, and, in C3, the PUCCH transmission resource is determined based on one ARI index. Then, the PUCCH signals are transmitted using the resources determined in C1 and C3, respectively.

Note that, although each PUCCH transmission resource in FIG. 13 is determined based on example 1, this is by no means limiting. For example, it is equally possible to determine one PUCCH-transmitting cell's resource based on example 1 and determine another PUCCH-transmitting cell's resource base don example 2.1. Also, although FIG. 13 shows a case in which a plurality of PUCCH signals are transmitted at the same time from two PUCCH-transmitting cells, the same holds with the case where three or more PUCCH-transmitting cells are selected. In this case, too, each PUCCH-transmitting cell's PUCCH resource is determined using an appropriate one of example 1, example 2.1 and example 2.2, and PUCCH signals are transmitted at the same time using a plurality of radio resources that are determined.

As described above, with example 2 of the radio communication method according to the present embodiment, when CCS and PUCCH on SCell are configured in a radio communication system in which DC or CA is employed and CCS to indicate scheduling for a plurality of cells is received, the decision according to example 1 is made with respect to each cell involved in the CCS, and, in addition, the PUCCH resource for each cell is determined based on, for example, how many cells' UCI is contained in the PUCCH signals to be transmitted from the PUCCH-transmitting cells, the number of PUCCH-configurable cells that are selected as PUCCH-transmitting cells and so on. By this means, it is possible to operate the PUCCH adequately in a system where CCS and PUCCH on SCell are configured at the same time, so that adequate PUCCH load balancing and PDCCH interference control can be executed.

Note that, although examples have been described above in which the number of CGs is two and the number of cells to constitute the CGs is five, the structure to which the radio communication method according to the present embodiment is applied is by no means limited to this. For example, there may be three or more CGs, or each CG may be formed with one cell.

(Configuration of PUCCH-Transmitting Cells, Channel Selection and so on by Signaling)

Note that, when CCS spans over CGs, from which PUCCH-configurable cell the PUCCH is transmitted may be configured from higher layers, or may be selected in the physical layer on a dynamic basis. For example, the PUCCH-transmitting cell may be directly configured through higher layer signaling (RRC signaling, broadcast signals and so on).

Also, the PUCCH-transmitting cell may be selected dynamically by combining control information of higher layers and the physical layer. To be more specific, a structure may be employed here in which candidate PUCCH-transmitting cells are configured by higher layer signaling, and the PUCCH is transmitted from cells that are selected from the candidates based on physical layer information. For example, a structure may be employed in which the CIF specifies the PUCCH-transmitting cell in addition to the PDSCH-receiving cell. Also, for example, a structure may be employed here in which the ARI specifies the PUCCH-transmitting cell, in addition to the PUCCH resource.

Furthermore, as in the above-described case of configuring PUCCH-transmitting cells, a structure may be employed in which, when CCS spans over CGs, information as to whether channel selection is applied or simultaneous transmission is applied is specified by using higher layers and/or the physical layer.

By using these structures, it is possible to configure PUCCH-transmitting cells flexibly and configure channel selection and simultaneous transmission at the same time, so that it is possible to control and secure PUCCH off-loading, quality and so on, depending on network and traffic conditions and so on. Also, since existing physical layer control information is used again, it is possible to realize these structures without causing a deterioration of the quality of the PDCCH/EPDCCH, an increase of overhead and so on.

(Variation)

Note that, there is a possibility that PUCCH transmission for CQI/SR (Scheduling Request) is configured apart from the acknowledgement response signals in response to the PDSCH. To be more specific, PUCCH transmission for CQI/SR may be configured semi-statically by higher layers such as RRC signaling. Also, PUCCH transmission for CQI/SR may be configured in the PCell alone up to Rel. 11, and may be configured in the PCell and/or PUCCH-configurable SCells in Rel. 12 and later versions.

Also, there is a possibility that PUSCH transmission is granted in PUCCH transmission timings for acknowledgement response signals in response to the PDSCH. PUSCH transmission in this case may take place in all the uplink cells where UL-CA is configured.

In view of the above, a structure may be employed here in which, in timings where the PUCCH and/or the PUSCH for CQI/SR is transmitted, the PUCCH resource is determined as follows, without using the PUCCH resource allocation methods of the above-described examples. For example, a structure may be employed in which, in a timing where a PUCCH resource for CQI/SR is configured, an acknowledgement response signal is multiplexed over this PUCCH resource. Also, a structure may be employed here in which, in a timing where a PUSCH resource is configured, an acknowledgement response signal is multiplexed over this PUSCH resource.

(Structure of Radio Communication System)

Now, an example of a radio communication system according to the present embodiment will be described in detail below. Note that the same components will be assigned the same codes, and overlapping description will be omitted.

Figure 14:
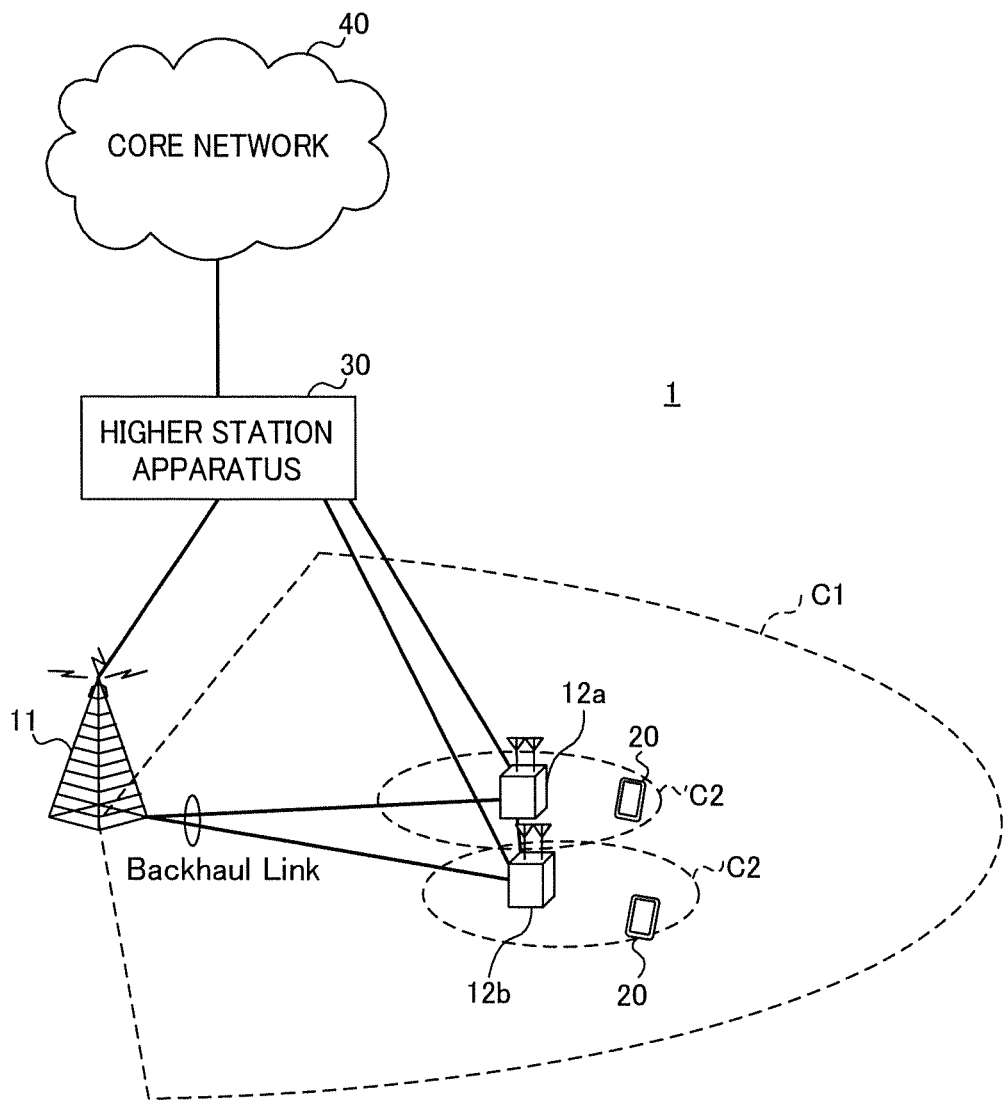
FIG. 14 is a diagram to show an example of a schematic structure of a radio communication system according to the present embodiment.

FIG. 14 is a diagram to show an example of a schematic structure of a radio communication system according to the present embodiment. Note that the radio communication system shown in FIG. 14 is, for example, the LTE system or a system to incorporate SUPER 3G. This radio communication system can adopt carrier aggregation (CA) to group a plurality of fundamental frequency blocks (component carriers) into one, where the system bandwidth of the LTE system constitutes one unit, and/or dual connectivity (DC). Also, this radio communication system may be referred to as "IMT-Advanced," "4G," "FRA (Future Radio Access)" and so on.

The radio communication system 1 shown in FIG. 14 includes a radio base station 11 that forms a macro cell C1, and radio base stations 12a and 12b that are placed inside the macro cell C1 and form small cells C2, which are narrower than the macro cell C1. Also, user terminals 20 are placed in the macro cell C1 and in each small cell C2. Also, CA and/or DC is applied between the radio base station 11 and the radio base stations 12, between the radio base station 11 and other radio base stations 11, or between the radio base stations 12 and other radio base station 12. Note that CA may be referred to as "intra-base-station CA (intra-eNB CA)," and DC may be referred to as "inter-base-station CA (inter-eNB CA)."

Between the user terminals 20 and the radio base station 11, communication is carried out using a carrier of a relatively low frequency band (for example, 2 GHz) and a wide bandwidth (referred to as, for example, "existing carrier," "legacy carrier" and so on). Meanwhile, between the user terminals 20 and the radio base stations 12, a carrier of a relatively high frequency band (for example, 3.5 GHz) and a wide bandwidth may be used, or the same carrier as that used in the radio base station 11 may be used. A new carrier type (NCT) may be used as the carrier type between the user terminals 20 and the radio base stations 12. A wire connection (optical fiber, the X2 interface, etc.) or a wireless connection is established between the radio base station 11 and the radio base stations 12 (or between the radio base stations 12).

The radio base station 11 and the radio base stations 12 are each connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "home eNodeBs," "micro base stations," "transmitting/receiving points" and so on. The radio base stations 11 and 12 will be hereinafter collectively referred to as a "radio base station 10," unless specified otherwise. Each user terminal 20 is a terminal to support various communication schemes such as LTE, LTE-A and so on, and may be both a mobile communication terminal and a stationary communication terminal.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks, per terminal, and allowing a plurality of terminals to use mutually different bands.

Now, communication channels used in the radio communication system shown in FIG. 14 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are communicated by the PDSCH. Downlink control information (DCI) such as scheduling information pertaining to the PDSCH and the PUSCH is communicated by the by the PDCCH (Physical Downlink Control Channel). The number of OFDM symbols to use for the PDCCH is communicated by the PCFICH (Physical Control Format Indicator CHannel). HARQ ACKs/NACKs in response to the PUSCH are communicated by the PHICH (Physical Hybrid-ARQ Indicator Channel). Also, the scheduling information for the PDSCH and the PUSCH may be communicated by the enhanced PDCCH (EPDCCH) as well. This EPDCCH is frequency-division-multiplexed with the PDSCH (downlink shared data channel).

Uplink communication channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are communicated by this PUSCH. Also, downlink radio quality information (CQI: Channel Quality Indicator) and uplink control information (UCI) such as ACKs/NACKs are communicated by the PUCCH.

Figure 15:
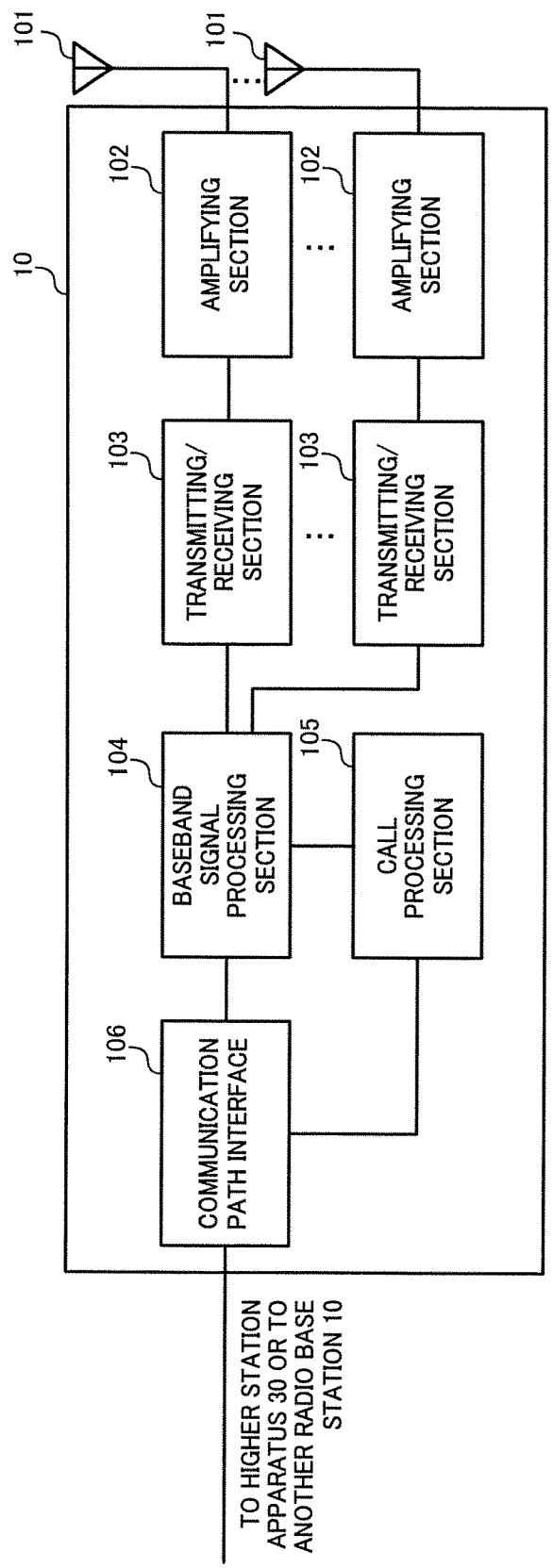
FIG. 15 is a diagram to show an example of an overall structure of a radio base station according to the present embodiment.

FIG. 15 is a diagram to show an example of an overall structure of a radio base station 10 (which may be either a radio base station 11 or 12) according to the present embodiment. The radio base station 10 has a plurality of transmitting/receiving antennas 101 for MIMO (Multi Input Multi Output) communication, amplifying sections 102, transmitting/receiving sections 103, a baseband signal processing section 104, a call processing section 105 and a communication path interface 106.

User data to be transmitted from the radio base station 10 to a user terminal 20 on the downlink is input from the higher station apparatus 30, into the baseband signal processing section 104, via the communication path interface 106.

In the baseband signal processing section 104, a PDCP layer process, division and coupling of user data, RLC (Radio Link Control) layer transmission processes including an RLC retransmission control transmission process, MAC (Medium Access Control) retransmission control (for example, an HARQ (Hybrid ARQ) transmission process), scheduling, transport format selection, channel coding, an inverse fast Fourier transform (IFFT) process and a precoding process are performed, and the result is forwarded to each transmitting/receiving section 103. Furthermore, downlink control channel signals are also subjected to transmission processes such as channel coding and an inverse fast Fourier transform, and are forwarded to each transmitting/receiving section 103.

Also, the baseband signal processing section 104 reports, to the user terminal 20, control information for allowing communication in the cell, through higher layer signaling (RRC signaling, broadcast signals and so on). The information for allowing communication in the cell includes, for example, the uplink or the downlink system bandwidth, feedback resource information and so on. Each transmitting/receiving section 103 converts baseband signals that are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for data to be transmitted from the user terminal 20 to the radio base station 10 on the uplink, radio frequency signals that are received in the transmitting/receiving antennas 101 are each amplified in the amplifying sections 102, converted into the baseband signal through frequency conversion in each transmitting/receiving section 103, and input in the baseband signal processing section 104.

In the baseband signal processing section 104, user data that is included in the baseband signal that is input is subjected to an inverse fast Fourier transform (IFFT) process, an inverse discrete Fourier transform (IDFT) process, error correction decoding, a MAC retransmission control receiving process, and RLC layer and PDCP layer receiving processes, and the result is forwarded to the higher station apparatus 30 via the communication path interface 106. The call processing section 105 performs call processing such as setting up and releasing communication channels, manages the state of the radio base station 10 and manages the radio resources.

Figure 16:
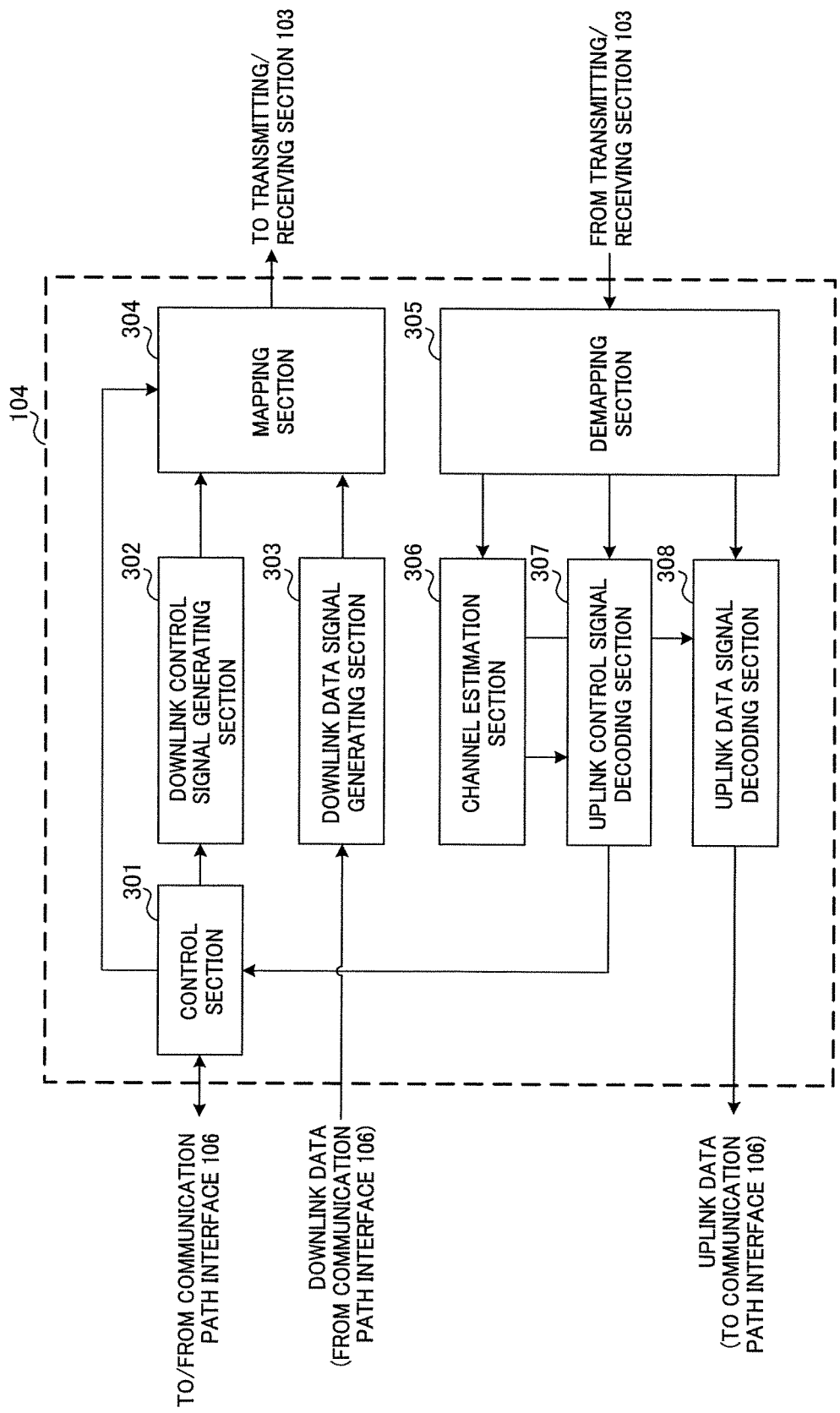
FIG. 16 is a diagram to shown an example of a functional structure of a radio base station according to the present embodiment.

FIG. 16 is a diagram to show an example of a principle functional structure of the baseband signal processing section 104 provided in the radio base station 10 according to the present embodiment. As shown in FIG. 16, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307 and an uplink data signal decoding section 308. Although only part of the structure of the baseband signal processing section 104 is shown here, assume that a structure to meet the needs is provided without shortage.

The control section 301 controls the scheduling of the downlink user data that is transmitted in the PDSCH, the downlink control information (DCI) that is communicated in the PDCCH and/or the enhanced PDCCH (EPDCCH), the downlink reference signals and so on. Also, the control section 301 controls the scheduling of the uplink data that is communicated in the PUSCH, the uplink control information that is communicated in the PUCCH or the PUSCH, the uplink reference signals and so on (allocation control). Information about the allocation control of uplink signals (uplink control signals and uplink user data) is reported to user terminals by using a downlink control signal (DCI).

To be more specific, the control section 301 controls the allocation of radio resources with respect to downlink signals and uplink signals, based on command information from the higher station apparatus 30, feedback information from each user terminal 20 and so on. That is, the control section 301 functions as a scheduler. Note that, when DC is applied to the user terminal 20, the control section 301 may be structured to control the scheduling of one or more cells, independently, per radio base station 10. Also, when CA is applied to the user terminal 20, the control section 301 may be structured to control the scheduling of multiple cells together, including cells of other radio base stations 10, or a structure may be employed in which the control sections 301 of other radio base stations 10 do not function as schedulers.

Also, when the PUCCH resources of the user terminal are determined depending on the resource and signal structure of the PDCCH/EPDCCH and so on, the control section 301 controls and reports the signal structure of the PDCCH/EPDCCH to the downlink control signal generating section 302.

The downlink control signal generating section 302 generates the downlink control signals (PDCCH signals and/or EPDCCH signals) determined to be allocated by the control section 301. To be more specific, based on commands from the control section 301, the downlink control signal generating section 302 generates DL assignments, which report downlink signal allocation information, and UL grants, which report uplink signal allocation information.

Note that, preferably, the downlink control signal generating section 302 is structured to generate the CIF of a downlink control signal in association with the PUCCH-transmitting cell pertaining to the cell where CCS is designated based on this CIF.

The downlink data signal generating section 303 generates downlink data signals (PDSCH signals) from the user data that is input from the communication path interface 106. The data signals that are generated in the data signal generating section 303 are subjected to a coding process and a modulation process based on coding rates and modulation schemes that are determined based on information such as the channel state information (CSI) from each user terminal 20.

Based on commands from the control section 301, the mapping section 304 controls the allocation of the downlink control signals generated in the downlink control signal generating section 302 and the downlink data signals generated in the downlink data signal generating section 303 to radio resources.

The demapping section 305 demaps uplink signals transmitted from the user terminal and separates the uplink signals. The channel estimation section 306 estimates channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signals, etc.) transmitted from the user terminal through an uplink control channel (PUCCH), and outputs the results to the control section 301. The uplink data signal decoding section 308 decodes the uplink data signals transmitted from the user terminal through the uplink shared channel (PUSCH), and outputs the results to the communication path interface 106.

Figure 17:
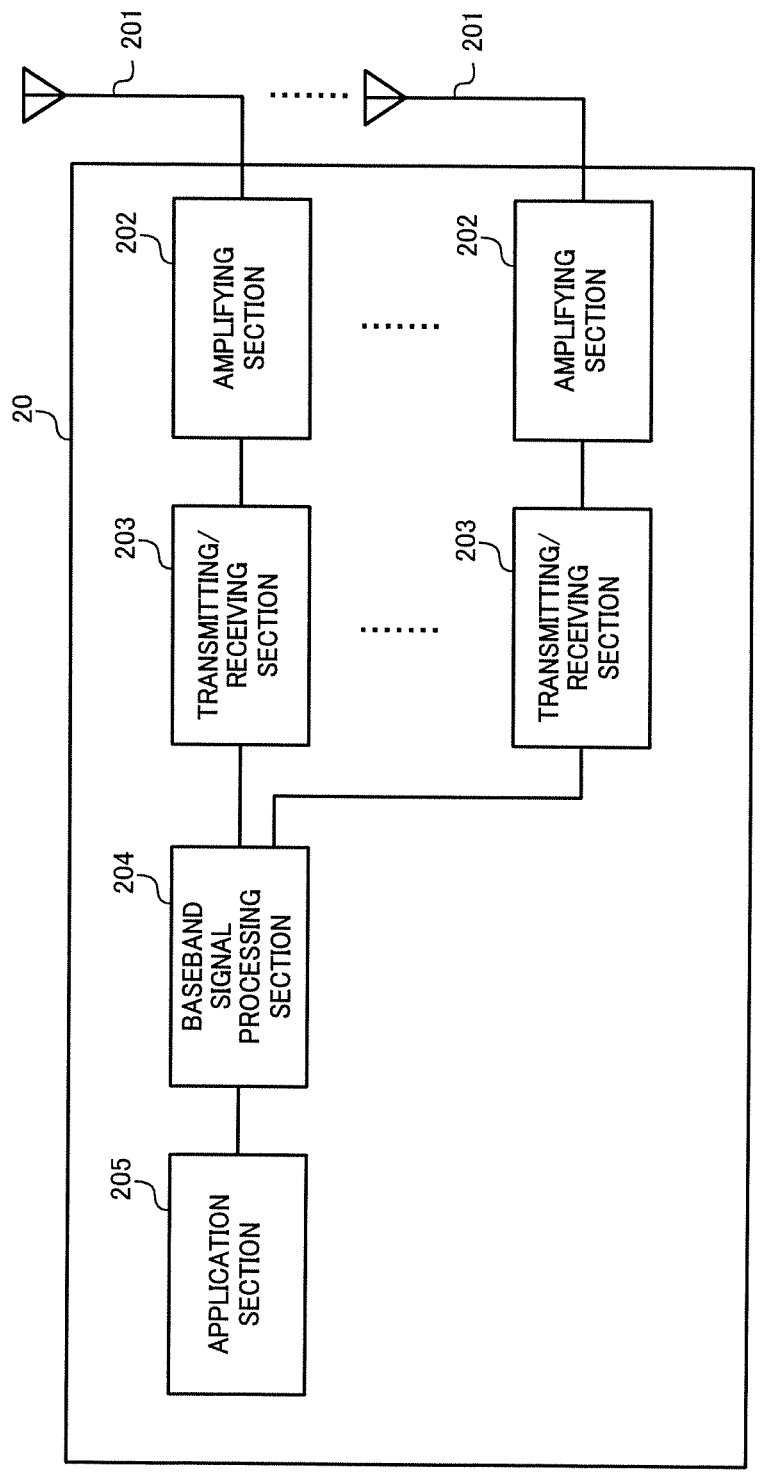
FIG. 17 is a diagram to show an example of an overall structure of a user terminal according to the present embodiment.

FIG. 17 is a diagram to show an example of an overall structure of a user terminal 20 according to the present embodiment. The user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving section 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer. Furthermore, in the downlink data, broadcast information is also forwarded to the application section 205.

Meanwhile, uplink user data is input from the application section 205 to the baseband signal processing section 204. In the baseband signal processing section 204, MAC retransmission control (for example, HARQ transmission process), channel coding, precoding, a discrete Fourier transform (DFT) process, an IFFT process and so on are performed, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signals having been subjected to frequency conversion, and transmit the resulting signals from the transmitting/receiving antennas 201.

Figure 18:
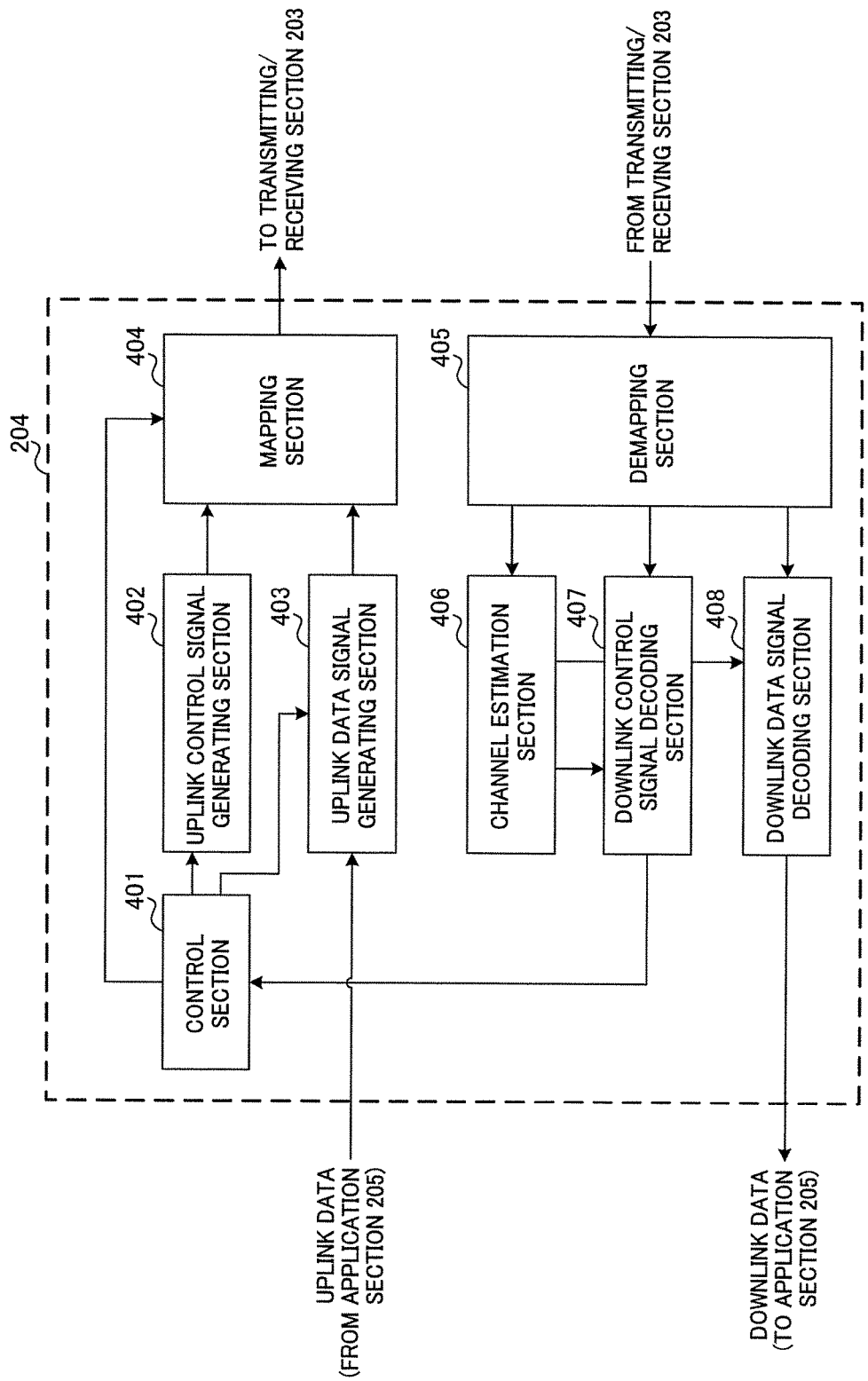
FIG. 18 is a diagram to show an example of a functional structure of a user terminal according to the present embodiment.

FIG. 18 is a diagram to show an example of a principle functional structure of the baseband signal processing section 204 provided in the user terminal 20. As shown in FIG. 18, the baseband signal processing section 204 provided in the user terminal 20 is comprised at least of a control section 401, an uplink control signal generating section 402, an uplink data signal generating section 403, a mapping section 404, a demapping section 405, a channel estimation section 406, a downlink control signal decoding section 407 and a downlink data signal decoding section 408. Although only part of the structure of the baseband signal processing section 204 is shown here, assume that a structure to meet the needs is provided without shortage.

The control section 401 controls the generation of uplink control signals (feedback signals) and uplink data signals based on downlink control signals (PDCCH signals) transmitted from the radio base station, the PDSCH signals received, and so on. The downlink control signals are output from the downlink control signal decoding section 407. Also, the control section 401 may manage information that is required for communication with the radio base station 10, such as information as to whether or not DC is applied to the user terminal 20, whether or not CA is applied, and so on.

Also, the control section 401 can use information about each cell and CG where the user terminal 20 is communicating. Also, the control section 401 can use information about the cell where each downlink signal is received.

Also, the control section 401 also functions as a feedback control section that controls the feedback of delivery acknowledgement signals (ACKs/NACKs) in response to PDSCH signals. To be more specific, the control section 401 controls the selection of the cell (CC) to feed back acknowledgment response signals, the PUCCH resources to allocate the acknowledgment response signals to, and so on. The control section 401 determines the cell to which the acknowledgment response signals are fed back, and the PUCCH resources to use, based on downlink control signals that are transmitted from the radio base station, and sends command to the uplink control signal generating section 402 and the mapping section 404.

Also, when a PDCCH to report CCS is detected, the control section 401 selects the PUCCH-transmitting cell from among the PUCCH-configurable cells that are configured by the radio base station, in order to determine the PUCCH resource. For example, the control section 401 may select the PUCCH-transmitting cell based on information reported in higher layers and/or the physical layer. For example, it may be possible to select the PUCCH-transmitting cell from information that is reported through higher layer signaling (RRC signaling, broadcast signals and so on). Also, it is equally possible to make selections on a dynamic basis by combining higher layer and physical layer control information. Also, the control section 401 may determine the PUCCH-transmitting cell based on the result of deciding whether the PDCCH-receiving cell and the cell that is designated based on CCS belong to the same CG. Also, a structure may be employed here in which, when information (CIF) to indicate CCS is associated with the cell to transmit the PUCCH pertaining to this CCS, the control section 401 selects the PUCCH-transmitting cell with reference to the CIF that is output from the downlink control signal decoding section 407. Note that the method of selecting the PUCCH-transmitting cell in the control section 401 is by no means limited to this.

Also, when a PDCCH to report CCS is detected, the control section 401 decides whether or not the PDCCH-receiving cell and the PUCCH-transmitting cell that is selected are the same, in order to determine the PUCCH resources. When deciding that the PDCCH-receiving cell and the PUCCH-transmitting cell are the same (when the decision is true), the control section 401 determines the PUCCH resource for allocating UCI, based on higher layer parameter and the CCE index of the PUCCH (the ECCE index in the event of the EPDCCH) where the DCI is allocated, and sends commands to the uplink control signal generating section 402 and the mapping section 404 so that feedback is sent using that resource. On the other hand, when deciding that the PDCCH-receiving cell and the PUCCH-transmitting cell are different (when the decision is false), the control section 401 determines the PUCCH resource for allocating UCI, based on higher layer parameters and the ARI that is contained in the DCI, and sends commands to the uplink control signal generating section 402 and the mapping section 404 so that feedback is sent in that resource (example 1).

Also, the control section 401 may be provided with a decision section which decides whether or not the cell that is specified by the information to indicate cross-carrier scheduling and the cell to transmit uplink control signals are the same. When the PDCCH-receiving cell and the PUCCH-transmitting cell are different and the decision made in the decision section is true, it is equally possible to determine the PUCCH resource for allocating UCI, based on PDSCH-related information that is received in the cell (PDSCH-receiving cell) designated by the information to indicate CCS, instead of the ARI, and send commands to the uplink control signal generating section 402 and the mapping section 404 so that feedback is sent using that resource. As for the PDSCH-related information, for example, the radio resource index pertaining to the PDSCH, the antenna port number of the demodulation reference signal for the PDSCH and so on may be used. Note that the decision as to whether or not the PDCCH-receiving cell and the PUCCH-transmitting cell are the same and the decision made in the decision section do not contradict each other, and both can be made.

Also, when a PUCCH signal that contains two cells' UCI is transmitted in one PUCCH-transmitting cell, the control section 401 determines the PUCCH resource for allocating UCI by applying channel selection to the PUCCH resources that are determined based on the above decision, and sends commands to the uplink control signal generating section 402 and the mapping section 404 so that feedback is sent using that resource (example 2.1).

Also, when a PUCCH signal that contains three or more cells' UCI is transmitted in one PUCCH-transmitting cell, the control section 401 sends commands to the uplink control signal generating section 402 and the mapping section 404 so that UCI in PUCCH format 3 is allocated to the PUCCH resource determined based on the above decision and fed back (example 2.2).

Also, when two or more cells are selected as PUCCH-transmitting cells, the control section 401 sends commands to the uplink control signal generating section 402 and the mapping section 404 so that PUCCH signals are transmitted at the same time from PUCCH resources that are determined based on the above decision (example 2.3). Note that, in this case, it is possible to apply channel selection to each PUCCH signal, or allocate UCI of PUCCH format 3.

Note that the control section 401 may decide whether DC is applied and/or whether CA is applied, based on information that is reported from the network (for example, the radio base station 10, the higher station apparatus 30 and so on). This information may be a direct piece of information to indicate that DC or CA is applied, or may be an indirect piece of information (for example, information to indicate that an MCG and an SCG are configured, information regarding the architecture to use in communication, information regarding backhaul and so on). Also, this information may be configured by higher layer signaling (RRC signaling, broadcast signals and so on), or may be included in downlink signals.

The uplink control signal generating section 402 generates uplink control signals (feedback signals such as acknowledgment response signals and CSI) based on commands from the control section 401. Also, the uplink data signal generating section 403 generates uplink data signals based on commands from the control section 401. Note that, when a UL grant is contained in a downlink control signal reported from the radio base station, the control section 401 commands the uplink data signal generating section 403 to generate an uplink data signal.

The mapping section 404 (allocation section) controls the allocation of the uplink control signals (UCI) and the uplink data signals to radio resources based on commands from the control section 401. For example, depending on the cell (CC) to send feedback via the PUCCH, the mapping section 404 allocates feedback signals to the PUCCH of that cell.

The demapping section 405 demaps the downlink signals transmitted from the radio base station 10 and separates the downlink signals. The channel estimation section 406 estimates channel states from the reference signals included in the received signals separated in the demapping section 405, and outputs the estimated channel states to the downlink control signal decoding section 407 and the downlink data signal decoding section 408.

The downlink control signal decoding section 407 decodes the downlink control signals (PDCCH signals) transmitted in the downlink control channel (PDCCH), and outputs the scheduling information (information regarding the allocation to uplink resources) to the control section 401.

The downlink data signal decoding section 408 decodes the downlink data signals transmitted via the downlink shared channel (PDSCH) and outputs the results to the application section 205.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. For example, a plurality of examples described above may be combined and implemented as appropriate. Consequently, the description herein is provided only for the purpose of explaining examples, and should by no means be construed to limit the present invention in any way.

The invention claimed is:

1. A user terminal that communicates with a plurality of cell groups, each group being formed with one or more cells, the user terminal comprising:
- a receiver that receives downlink control information; and
- a processor that selects at least one cell from cells which are configured in each cell group and to which uplink control information is able to be allocated, and controls the cell as a cell to transmit the uplink control information, wherein the cell to transmit the uplink control information is a secondary cell (SCell), and
- wherein, when the downlink control information includes information indicative of cross-carrier scheduling, the processor determines a resource to transmit the uplink control information based on a higher layer parameter and a Control Channel Element (CCE) index of a downlink control channel to which the downlink control information is allocated.

2. A radio communication method for a user terminal that communicates with a plurality of cell groups, each group being formed with one or more cells, radio communication method comprising:
- receiving downlink control information; and
- selecting at least one cell from cells which are configured in each cell group and to which uplink control information is able to be allocated, and controlling the cell as a cell to transmit the uplink control information, wherein the cell to transmit the uplink control information is a secondary cell (SCell),
- wherein, when the downlink control information includes information indicative of cross-carrier scheduling, a resource to transmit the uplink control information is determined based on a higher layer parameter and a Control Channel Element (CCE) index of a downlink control channel to which the downlink control information is allocated.

* * * * *